US010158811B2

(12) United States Patent

Ichikawa et al.

(10) Patent No.: US 10,158,811 B2

(45) Date of Patent: Dec. 18, 2018

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Manabu Ichikawa, Hachioji (JP); Hiroki Maruyama, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 44 days.

(21) Appl. No.: 15/632,743

(22) Filed: Jun. 26, 2017

(65) Prior Publication Data

US 2017/0295329 A1 Oct. 12, 2017

Related U.S. Application Data

(63) Continuation of application No. PCT/JP2015/051423, filed on Jan. 20, 2015.

(51) Int. Cl.

*G06K 9/00* (2006.01)
*H04N 5/357* (2011.01)

(Continued)

(52) U.S. Cl.

CPC ............. *H04N 5/357* (2013.01); *H04N 1/409* (2013.01); *H04N 5/341* (2013.01); *H04N 5/772* (2013.01);

(Continued)

(58) Field of Classification Search

CPC ........ H04N 5/357; H04N 1/409; H04N 5/341; H04N 5/772; H04N 5/907; H04N 5/956; H04N 5/213; H04N 7/14

See application file for complete search history.

(56) References Cited

U.S. PATENT DOCUMENTS 7,106,368 B2 * 9/2006 Daiku .................... H04N 5/235 348/226.1
7,280,135 B2 * 10/2007 Kim ....................... H04N 5/235 348/228.1

(Continued)

FOREIGN PATENT DOCUMENTS

JP 2008-245121 A 10/2008
JP 2010-103855 A 5/2010

(Continued)

OTHER PUBLICATIONS

International Search Report dated Apr. 21, 2015 issued in PCT/JP2015/051423.

*Primary Examiner* — Jonathan S Lee

(74) *Attorney, Agent, or Firm* — Scully, Scott, Murphy & Presser, P.C.

(57) ABSTRACT

Provided is an image processing apparatus for correcting blinking defect noise included in image data generated by an image sensor, the image sensor including pixels arranged two-dimensionally and read-out circuits configured to read out a pixel value. The image processing apparatus is configured to: acquire noise information that associates the pixel value with positional information of the read-out circuits or positional information of each of the pixels, and with feature data related to blinking defect noise attributed to the read-out circuits; determine whether the blinking defect noise occurs on a pixel of interest based on the noise information; calculate candidate values indicating a correction amount for correcting the blinking defect noise based on the noise information and a pixel value of the pixel of interest if the blinking defect noise occurs; and correct the pixel value of the pixel of interest based on the candidate values.

18 Claims, 19 Drawing Sheets

(51) Int. Cl.

| | |
|---|---|
| ***H04N 1/409*** | (2006.01) |
| ***H04N 5/341*** | (2011.01) |
| ***H04N 5/956*** | (2006.01) |
| ***H04N 5/77*** | (2006.01) |
| ***H04N 5/907*** | (2006.01) |
| *H04N 5/213* | (2006.01) |
| *H04N 7/14* | (2006.01) |

(52) U.S. Cl.
CPC ............. *H04N 5/907* (2013.01); *H04N 5/956* (2013.01); *H04N 5/213* (2013.01); *H04N 7/14* (2013.01)

(56) References Cited

U.S. PATENT DOCUMENTS 7,589,763 B2 * 9/2009 Ono ....................... H04N 5/235 348/226.1
2012/0273655 A1 11/2012 Ise

FOREIGN PATENT DOCUMENTS

JP 2012-105063 A 5/2012
JP 2012-231333 A 11/2012
JP 2013-219665 A 10/2013
JP 2014-212450 A 11/2014

* cited by examiner

IMAGE PROCESSING APPARATUS, IMAGE PROCESSING METHOD, AND COMPUTER-READABLE RECORDING MEDIUM

CROSS REFERENCES TO RELATED APPLICATIONS

This application is a continuation of PCT international application Ser. No. PCT/JP2015/051423, filed on Jan. 20, 2015 which designates the United States, incorporated herein by reference.

BACKGROUND

1. Technical Field

The disclosure relates to an image processing apparatus, an image processing method, and a computer-readable recording medium for correcting blinking defect noise that varies within a fixed range, such as RTS noise occurred in an image sensor including a plurality of pixels that is two-dimensionally arranged.

2. Related Art

In recent years, in an image sensor such as a complementary metal oxide semiconductor (CMOS), miniaturization of a pixel and a read-out circuit that reads out a signal from the pixel has been progressing. In this context of miniaturization, there is a problem of lowered sensitivity and increased noise. To cope with lowered sensitivity, by applying a sharing pixel structure of reading out a signal with one read-out circuit shared by a plurality of pixels, it is possible to reduce the area needed for the circuit in the image sensor and enhance the aperture ratio (proportion of light receiving portion) of each of the pixels, thereby enhancing the sensitivity.

Noise that occurs in the image sensor includes not only dark current shot noise due to dark current and random noise attributed to thermal noise on the read-out circuits, but also defective pixel on which a pixel value constantly indicates an abnormal value, blinking defect noise that causes the pixel value to vary in individual imaging, or the like. The blinking defect noise includes a random telegraph signal (RTS) noise attributed to the read-out circuit. As a technique of correcting this RTS noise, there is a known technique of determining whether there is an effect of the RTS noise on a pixel of interest based on a pixel value of the pixel of interest on a captured image, a pixel value of a surrounding pixel of the pixel of interest, and a noise level of the RTS noise (hereinafter, referred to as a "RTS noise level") detected beforehand for each of the pixels of the image sensor. In this technique, in a case where it is determined there is an effect of the RTS noise, addition or subtraction corresponding to the RTS noise level is performed on the pixel value of the pixel of interest (refer to JP 2012-105063 A).

SUMMARY

In some embodiments, provided is an image processing apparatus for correcting blinking defect noise included in a plurality of pieces of image data generated by an image sensor, the image sensor including a plurality of pixels arranged two-dimensionally to receive light from outside and generate a signal corresponding to an amount of the received light, and including a plurality of read-out circuits configured to read out the signal as a pixel value. The image processing apparatus includes: a noise information acquiring unit configured to acquire noise information that associates the pixel value with positional information of the plurality of read-out circuits or positional information of each of the plurality of pixels, and with feature data related to blinking defect noise attributed to the plurality of read-out circuits; a noise pixel determination unit configured to determine whether the blinking defect noise occurs on a pixel of interest based on the noise information acquired by the noise information acquiring unit; a candidate value calculation unit configured to calculate a plurality of candidate values indicating a correction amount for correcting the blinking defect noise based on the noise information acquired by the noise information acquiring unit and based on a pixel value of the pixel of interest if the noise pixel determination unit determines that the blinking defect noise occurs; and a correction unit configured to correct the pixel value of the pixel of interest based on the plurality of candidate values calculated by the candidate value calculation unit.

In some embodiments, provided is an image processing method for correcting blinking defect noise included in a plurality of pieces of image data generated by an image sensor, the image sensor including a plurality of pixels arranged two-dimensionally to receive light from outside and generate a signal corresponding to an amount of the received light, and including a plurality of read-out circuits configured to read out the signal as a pixel value. The method includes: acquiring noise information that associates the pixel value with positional information of the plurality of read-out circuits or positional information of each of the plurality of pixels, and with feature data related to blinking defect noise attributed to the plurality of read-out circuits; determining whether the blinking defect noise occurs on a pixel of interest based on the noise information; calculating a plurality of candidate values indicating a correction amount for correcting the blinking defect noise based on the noise information and a pixel value of the pixel of interest if the blinking defect noise occurs; and correcting the pixel value of the pixel of interest based on the plurality of candidate values.

In some embodiments, provided is a non-transitory computer-readable recording medium with an executable program stored thereon. The program causes an image processing apparatus configured to correct blinking defect noise included in a plurality of pieces of image data generated by an image sensor, the image sensor including a plurality of pixels arranged two-dimensionally to receive light from outside and generate a signal corresponding to an amount of the received light, and including a plurality of read-out circuits configured to read out the signal as a pixel value, to execute: acquiring noise information that associates the pixel value with positional information of the plurality of read-out circuits or positional information of each of the plurality of pixels, and with feature data related to blinking defect noise attributed to the plurality of read-out circuits; determining whether the blinking defect noise occurs on a pixel of interest based on the noise information; calculating a plurality of candidate values indicating a correction amount for correcting the blinking defect noise based on the noise information and a pixel value of the pixel of interest if the blinking defect noise occurs; and correcting the pixel value of the pixel of interest based on the plurality of candidate values.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments of the invention will be described below with reference to the drawings. The present invention is not limited by the embodiments described below. The same reference signs are used to designate the same elements throughout the drawings.

First Embodiment

Configuration of Imaging System

Figure 1:
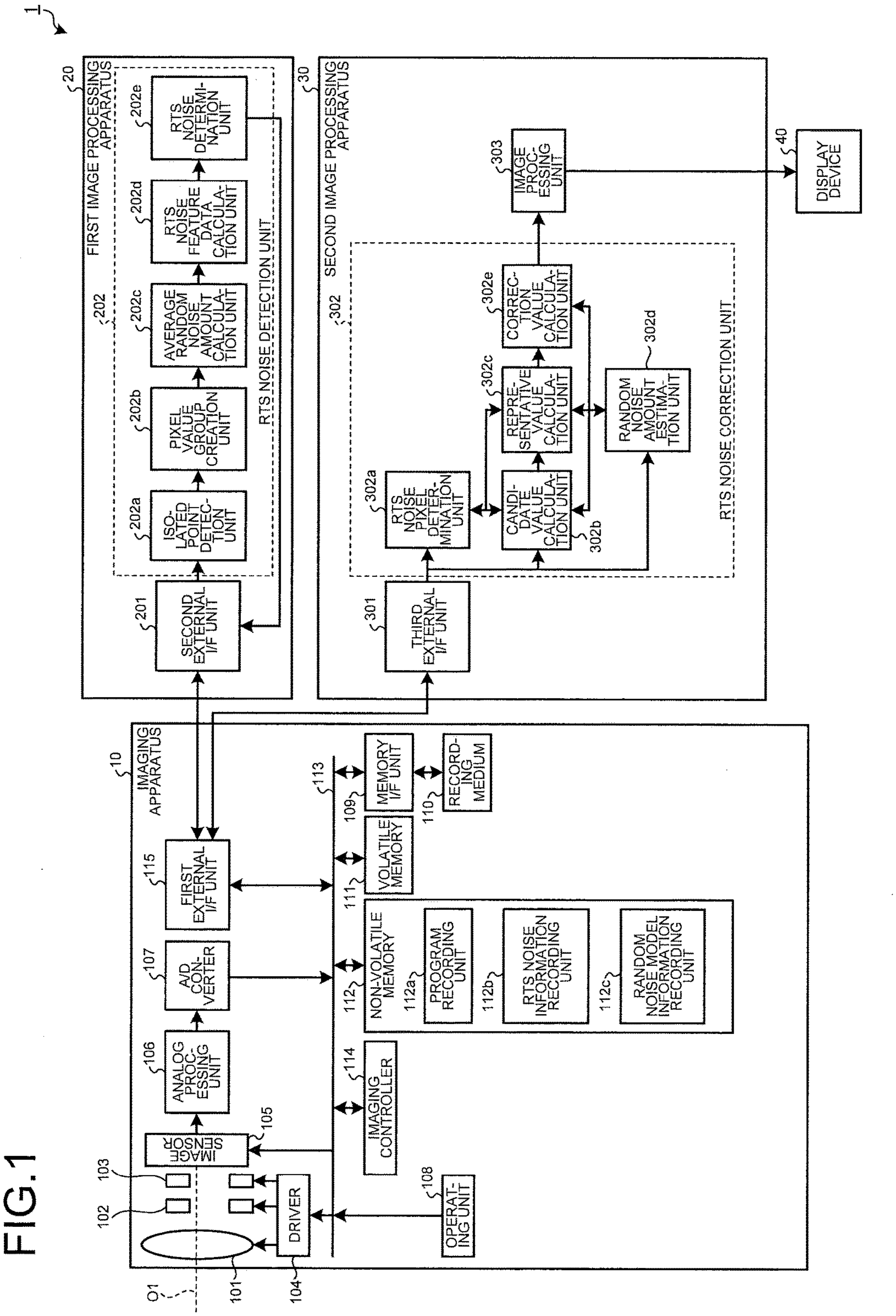
FIG. 1 is a block diagram schematically illustrating a configuration of an imaging system according to a first embodiment of the present invention.

FIG. 1 is a block diagram schematically illustrating a configuration of an imaging system according to a first embodiment of the present invention. An imaging system 1 illustrated in FIG. 1 includes an imaging apparatus 10, a first image processing apparatus 20, a second image processing apparatus 30, and a display device 40.

Configuration of Imaging Apparatus

First, a configuration of the imaging apparatus 10 will be described. As illustrated in FIG. 1, the imaging apparatus 10 includes an optical system 101, a diaphragm 102, a shutter 103, a driver 104, an image sensor 105, an analog processing unit 106, an A/D converter 107, an operating unit 108, a memory I/F unit 109, a recording medium 110, a volatile memory 111, a non-volatile memory 112, a bus 113, an imaging controller 114, and a first external I/F unit 115.

The optical system 101 includes a plurality of lenses. The optical system 101 includes a focus lens and a zoom lens, for example.

The diaphragm 102 adjusts exposure by limiting an incident amount of light collected by the optical system 101. Under the control of the imaging controller 114, the diaphragm 102 limits the incident amount of the light collected by the optical system 101.

The shutter 103 sets the state of the image sensor 105 to an exposure state or a light-shielding state. The shutter 103 includes a focal plane shutter, for example.

Under the control of the imaging controller 114 described below, the driver 104 drives the optical system 101, the diaphragm 102, and the shutter 103. For example, the driver 104 performs zoom magnification change or focusing position adjustment for the imaging apparatus 10 by moving the optical system 101 along an optical axis O1.

Under the control of the imaging controller 114 described below, the image sensor 105 receives the light collected by the optical system 101, converts the received light into image data (electric signal), and outputs the image data. The image sensor 105 includes a complementary metal oxide semiconductor (CMOS) including a plurality of two-dimensionally arranged pixels. An RGB filter arranged in a Bayer array is disposed on a front surface of each of the pixels. The image sensor 105 is not limited to the Bayer array but may be in a stacked form such as Foveon. Moreover, it is possible to apply not only RGB filter but also any other filter such as a complementary color filter. Alternatively, it may be possible to separately dispose a light source capable of emitting light beams of different colors on a time division basis without disposing a filter on the image sensor 105, and to form a color image using sequentially captured images while changing the colors of the beams to be emitted.

Figure 2:
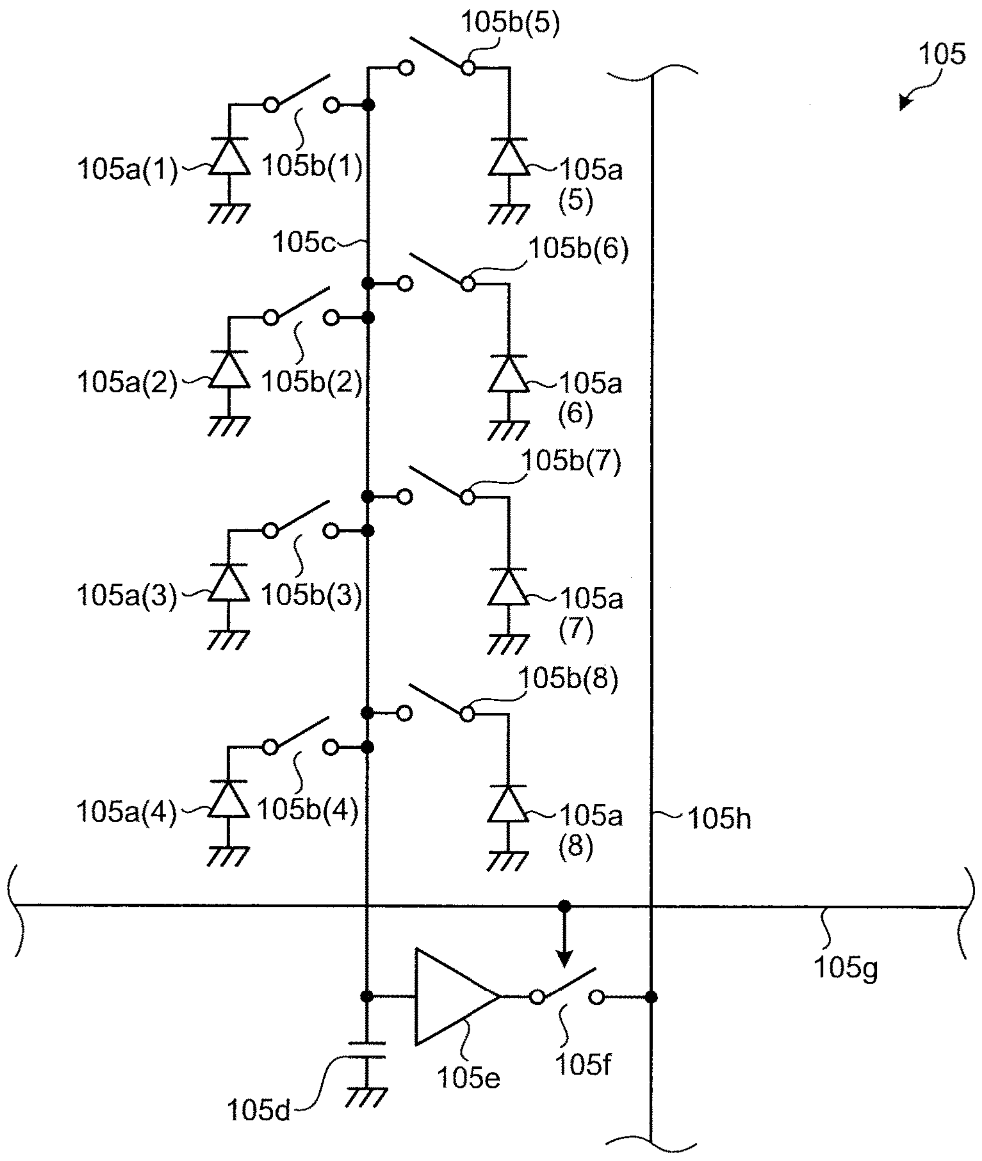
FIG. 2 is a diagram schematically illustrating a configuration of main portions of an image sensor according to the first embodiment of the present invention.

Now, the configuration of the image sensor 105 will be described in detail. FIG. 2 is a diagram schematically illustrating the configuration of main portions of the image sensor 105. The image sensor 105 in FIG. 2 is an exemplary case where a read-out circuit is shared by a plurality of pixels in order to enhance sensitivity by increasing the aperture ratio of the pixel. The image sensor 105 illustrated in FIG. 2 includes one read-out circuit arranged for eight pixels, that is, two pixels in the horizontal direction (lateral direction)×four pixels in the vertical direction (longitudinal direction). While FIG. 2 illustrates an exemplary case where one read-out circuit is arranged as a group for eight pixels, that is, two pixels in the horizontal direction (lateral direction)×four pixels in the vertical direction (longitudinal direction), the image sensor 105 according to the first embodiment has a configuration in which the above-described pixels and the read-out circuit are arranged side by side in horizontal and vertical directions.

As illustrated in FIG. 2, the image sensor 105 includes a plurality of pixels (photodiodes) 105*a*, a first switch 105*b*, vertical transfer line 105*c*, a floating diffusion (FD) unit 105*d*, an amplifier unit 105*e*, a second switch 105*f*, a control line 105*g*, and a transfer line 105*h*. Each of the plurality of pixels 105*a* receives light by exposure, performs photoelectric conversion, thereby generating electrical charges in accordance with an exposure amount. The first switch 105*b* is provided on each of the plurality of pixels 105*a*, and opens or closes in accordance with the control of the imaging controller 114. The vertical transfer line 105*c* transfers signals (electrical charges) output from each of the plurality of pixels 105*a* in the vertical direction. The floating diffusion (FD) unit 105*d* stores the signals output from the plurality of pixels 105*a*. The amplifier unit 105*e* amplifies the signals output from the FD unit 105*d*. The second switch 105*f* opens or closes according to the control of the imaging controller 114. The control line 105*g* controls the second switch 105*f*. The transfer line 105*h* transfers the electrical signal amplified by the amplifier unit 105*e*.

In a case where the above-configured image sensor 105 reads out a signal that corresponds to the exposure amount on pixels 105*a*(1) to 105*a*(8) as a pixel value, the electrical charge generated on the pixel 105*a*(1) is transferred to the FD unit 105*d* by first resetting the FD unit 105*d* and by turning on solely a first switch 105*b*(1) by the imaging controller 114. Thereafter, the imaging controller 114 turns on the second switch 105*f*, whereby the image sensor 105 causes the amplifier unit 105*e* to amplify the electrical charges stored in the FD unit 105*d* and reads out (outputs) the electrical charge as a pixel value. Next, the image sensor 105 resets the FD unit 105*d* and the imaging controller 114 turns on solely a first switch 105*b*(2), whereby the image sensor 105 transfers the electrical charges generated on the pixel 105*a*(2) to the FD unit 105*d*. Thereafter, the imaging controller 114 turns on the second switch 105*f*, whereby the image sensor 105 causes the amplifier unit 105*e* to amplify the electrical charges stored in the FD unit 105*d* and reads out the electrical charges as a pixel value. By sequentially performing such read-out operation, the image sensor 105 can sequentially output the signal that corresponds to the exposure amount on each of the pixels 105*a*(1) to 105*a*(8), as a pixel value. In the first embodiment, the amplifier unit 105*e* functions as a read-out circuit that reads out electrical charges from each of the plurality of pixels 105*a*.

Returning to FIG. 1, description of the configuration of the imaging apparatus 10 follows below.

The analog processing unit 106 performs predetermined analog processing onto an analog signal input from the image sensor 105 and outputs the processed signal to the A/D converter 107. Specifically, the analog processing unit 106 performs noise reduction processing, gain-up processing, or the like, on the analog signal input from the image sensor 105. For example, the analog processing unit 106 performs, onto the analog signal, reduction of reset noise, etc. and waveform shaping, and then, further performs gain-up so as to achieve intended brightness.

The A/D converter 107 generates digital image data (hereinafter, referred to as "RAW image data") by performing A/D conversion onto the analog signal input from the analog processing unit 106, and outputs the generated data to the volatile memory 111 via the bus 113. The A/D converter 107 may directly output the RAW image data to each of portions of the imaging apparatus 10 described below. It may be possible to configure such that the analog processing unit 106 and the A/D converter 107 are provided on the image sensor 105, and that the image sensor 105 directly outputs digital RAW image data.

The operating unit 108 provides various commands to the imaging apparatus 10. Specifically, the operating unit 108 includes a power switch, a release switch, an operation switch, and a moving image switch. The power switch switches the power supply states of the imaging apparatus 10 between an on-state and an off-state. The release switch provides an instruction of still image shooting. The operation switch switches various settings of the imaging apparatus 10. The moving image switch provides an instruction of moving image shooting.

The recording medium 110 includes a memory card attached from outside of the imaging apparatus 10, and is removably attached onto the imaging apparatus 10 via the memory I/F unit 109. Moreover, the recording medium 110 may output programs and various types of information to the non-volatile memory 112 via the memory I/F unit 109 under the control of the imaging controller 114.

The volatile memory 111 temporarily stores image data input from the A/D converter 107 via the bus 113. For example, the volatile memory 111 temporarily stores image data sequentially output from the image sensor 105 frame by frame, via the analog processing unit 106, the A/D converter 107, and the bus 113. The volatile memory 111 includes a synchronous dynamic random access memory (SDRAM).

The non-volatile memory 112 records various programs needed to operate the imaging apparatus 10 and various types of data used in execution of the program. Moreover, the non-volatile memory 112 includes a program recording unit 112*a*, an RTS noise information recording unit 112*b*, and a random noise model information recording unit 112*c*. The RTS noise information recording unit 112*b* records RTS noise positional information of the RTS noise on the image sensor 105, input via the first external I/F unit 115. The random noise model information recording unit 112*c* records a random noise model. The non-volatile memory 112 includes a flash memory.

The bus 113 includes a transmission line that connects individual components of the imaging apparatus 10 with each other, and transfers various types of data generated inside the imaging apparatus 10 to each of the individual components of the imaging apparatus 10.

The imaging controller 114 includes a central processing unit, and integrally controls operation of the imaging apparatus 10 by providing instruction and transferring data to individual components of the imaging apparatus 10 in response to an instruction signal and a release signal from the operating unit 108. For example, in a case where a second release signal has been input from the operating unit 108, the imaging controller 114 performs control of starting shooting operation on the imaging apparatus 10. Herein, the shooting operation on the imaging apparatus 10 is operation of predetermined processing performed by the analog processing unit 106 and the A/D converter 107, onto the image data output by the image sensor 105. The image data processed in this manner are recorded in the recording medium 110 via the bus 113 and the memory I/F unit 109 under the control of the imaging controller 114.

The first external I/F unit 115 outputs information input from external apparatuses via the bus 113, to the non-volatile memory 112 or the volatile memory 111, and outputs, to external apparatuses via the bus 113, information recorded in the volatile memory 111, information stored in the non-volatile memory 112, and the image data generated by the image sensor 105. Specifically, the first external I/F unit 115 outputs the image data generated by the image sensor 105 to the first image processing apparatus 20 and the second image processing apparatus 30 via the bus 113.

Configuration of First Image Processing Apparatus

Next, the configuration of the first image processing apparatus 20 will be described. The first image processing apparatus 20 includes a second external I/F unit 201, and an RTS noise detection unit 202.

The second external I/F unit 201 obtains the image data generated by the image sensor 105, via the first external I/F unit 115 of the imaging apparatus 10, and outputs the obtained image data to the RTS noise detection unit 202. Moreover, the second external I/F unit 201 outputs the information input from the RTS noise detection unit 202, to the imaging apparatus 10.

The RTS noise detection unit 202 detects RTS noise that occurs on the image sensor 105 based on the RAW image captured by the imaging apparatus 10, and records a result of the detection in the non-volatile memory 112 via the second external I/F unit 201, the first external I/F unit 115, and the bus 113. The RTS noise detection unit 202 includes an isolated point detection unit 202*a*, a pixel value group creation unit 202*b*, an average random noise amount calculation unit 202*c*, an RTS noise feature data calculation unit 202*d*, and an RTS noise determination unit 202*e*.

Based on a dark-time RAW image (hereinafter, referred to simply as the "dark-time RAW image) that corresponds to a plurality of pieces of RAW image data captured in a state where the image sensor 105 is light-shielded (for example, in a state where the shutter 103 is closed; hereinafter, referred to as a "dark-time state"), the isolated point detection unit 202*a* performs detection of an isolated point and subtraction of OB components, then, outputs a result of isolation detection and the dark-time RAW image after subtraction, to the pixel value group creation unit 202*b*. In the first embodiment, the isolated point detection unit 202*a* functions as a defective pixel detection unit.

The pixel value group creation unit 202*b* excludes a pixel value of the pixel detected as an isolated point on the basis a plurality of pixel values of the dark-time RAW images after subtraction by the isolated point detection unit 202*a*. Further, the pixel value group creation unit 202*b* creates a plurality of pixel value groups by performing classification for each of the read-out circuits (amplifier units 105*e*) based on the sharing pixel system of the image sensor 105, and outputs the plurality of pixel value groups to the average random noise amount calculation unit 202*c*. Alternatively, the pixel value group creation unit 202*b* may use the pixel value corrected in accordance with the detected isolated point, without excluding the pixel value of the pixel detected as an isolated point by the isolated point detection unit 202*a*.

The average random noise amount calculation unit 202*c* calculates a random noise amount of each of the plurality of pixel value groups created by the pixel value group creation unit 202*b*, calculates a random noise amount of each of the plurality of dark-time RAW images, and outputs individual calculated random noise amounts to the RTS noise feature data calculation unit 202*d*. Furthermore, using the random noise amounts calculated as described above, the average random noise amount calculation unit 202*c* calculates an average random noise amount, that is, an average of random noise amounts of all the pixel value groups based on identification of a pixel value group having a possibility of occurrence of RTS noise, and based on the random noise amount of the other pixel value groups. In the first embodiment, the average random noise amount calculation unit 202*c* functions as a random noise amount calculation unit.

Figure 4:
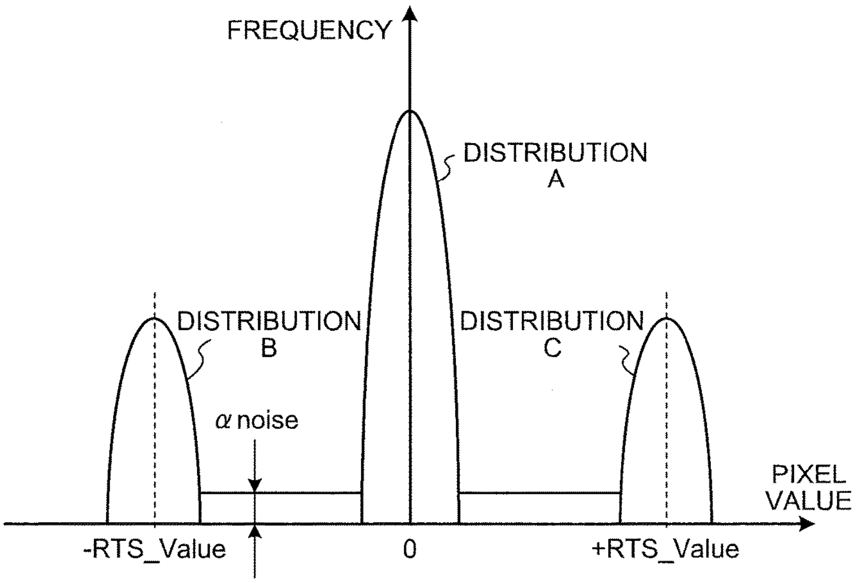
FIG. 4 is a diagram illustrating distribution of pixel values read out by using the amplifier unit in which RTS noise is occurring.

The RTS noise feature data calculation unit 202*d* calculates RTS noise feature data, that is, the feature data representing the RTS noise level and a frequency of occurrence, for the pixel value group having a possibility of occurrence of RTS noise, and outputs the calculated RTS noise feature data to the RTS noise determination unit 202*e*. Following the distribution of the pixel value of the pixel value group on which RTS noise occurs, as illustrated in FIG. 4, the RTS noise feature data calculation unit 202*d* calculates RTS noise feature data using fitting processing described below, or the like. The RTS noise feature data calculation unit 202*d* functions as a feature data calculation unit, in the present embodiment.

Based on distribution of individual pixel values of the plurality of groups created by the pixel value group creation unit 202*b*, the RTS noise determination unit 202*e* determines whether RTS noise occurs as blinking defect noise, for each of the plurality of pixel value groups. Specifically, based on the RTS noise feature data calculated by the RTS noise feature data calculation unit 202*d* for the pixel value group having a possibility of occurrence of RTS noise, the RTS noise determination unit 202*e* determines (detects) whether RTS noise of a level that needs correction occurs, for the pixels of the image sensor 105 constituting corresponding pixel group (pixels of the image sensor 105 that share the same amplifier unit 105*e* (read-out circuit). In a case where the RTS noise is occurring, the RTS noise determination unit 202*e* records RTS noise information in the non-volatile memory 112 of the imaging apparatus 10. The RTS noise information is information in which an RTS noise detection result, positional information of the read-out circuit (amplifier unit 105*e*) of the corresponding image sensor 105 (that is, positional information of a sharing pixel block formed solely with the pixels that share the read-out circuit), and the feature data calculated by the RTS noise feature data calculation unit 202*d*, are associated with each other. In the present embodiment, the RTS noise determination unit 202*e* functions as a noise determination unit.

Configuration of Second Image Processing Apparatus

Next, the configuration of the second image processing apparatus 30 will be described. The second image processing apparatus 30 includes a third external I/F unit 301, an RTS noise correction unit 302, and an image processing unit 303.

The third external I/F unit 301 obtains the image data generated by the image sensor 105 and RTS noise information related to the RTS noise output from the non-volatile memory 112, via the first external I/F unit 115 of the imaging apparatus 10, and outputs the obtained image data and the RTS noise information to the RTS noise correction unit 302.

The RTS noise correction unit 302 performs RTS noise correction processing of correcting RTS noise onto the RAW image recorded in the RTS noise information recording unit 112*b* of the non-volatile memory 112 of the imaging apparatus 10, and outputs the corrected RAW image to the image processing unit 303. The RTS noise correction unit 302 includes an RTS noise pixel determination unit 302*a*, a candidate value calculation unit 302*b*, a representative value calculation unit 302*c*, a random noise amount estimation unit 302*d*, and a correction value calculation unit 302*e*.

The RTS noise pixel determination unit 302*a* obtains the RTS noise information recorded in the RTS noise information recording unit 112*b* of the imaging apparatus 10, via the third external I/F unit 301, the first external I/F unit 115, and the bus 113, determines whether RTS noise occurs on the pixel of the RAW image that has been obtained, and outputs a determination result to the candidate value calculation unit 302*b* and the representative value calculation unit 302*c*. Specifically, when the pixel position is input into the RTS noise pixel determination unit 302*a*, the RTS noise pixel determination unit 302*a* determines whether the RTS information that corresponds to the pixel is recorded on the RTS noise information recording unit 112*b* of the imaging apparatus 10. In a case where the information is recorded, the RTS noise pixel determination unit 302*a* outputs the RTS noise information (information indicating whether the RTS noise is present). In a case where the information is not recorded on the RTS noise information recording unit 112*b* of the imaging apparatus 10, the RTS noise pixel determination unit 302*a* determines the pixel to be a pixel free from occurrence of the RTS noise and does not output the RTS noise information.

In a case where the RTS noise pixel determination unit 302*a* determines that RTS noise occurs on the pixel of interest, the candidate value calculation unit 302*b* calculates a plurality of candidate values for a correction amount that corresponds to the pixel value of the pixel of interest, based on the pixel value of the pixel of interest on the RAW image, and the determination result from the RTS noise pixel determination unit 302*a*, and then, outputs the pixel value of the pixel of interest on the RAW image and the plurality of calculated candidate values, to each of the representative value calculation unit 302*c*, the random noise amount estimation unit 302*d*, and the correction value calculation unit 302*e*.

In a case where the RTS noise pixel determination unit 302*a* has determined that RTS noise occurs on the pixel of interest, the representative value calculation unit 302*c* calculates a representative value that corresponds to the pixel value for the case of no occurrence of RTS noise, based on the pixel that at least has been determined to be free from RTS noise by the RTS noise pixel determination unit 302*a* among the pixels around the pixel of interest, and based on a reference value of the random noise amount that corresponds to the pixel of interest, calculated by the random noise amount estimation unit 302*d* described below. The representative value calculation unit 302*c* outputs the pixel value of the pixel of interest on the RAW image, the plurality of candidate values, and the above-calculated representative value, to the correction value calculation unit 302*e*.

The random noise amount estimation unit 302*d* estimates the random noise amount that corresponds to the pixel value based on the random noise model recorded in the random noise model information recording unit 112*c* of the imaging apparatus 10, and outputs an estimation result to the representative value calculation unit 302*c*. That is, when a pixel value is input into the random noise amount estimation unit 302*d*, a random noise amount that corresponds to the pixel value is output.

In a case where the RTS noise pixel determination unit 302*a* has determined that the pixel is a pixel having a possibility of occurrence of RTS noise on the pixel of interest, the correction value calculation unit 302*e* corrects the pixel value of the pixel of interest based on the plurality of candidate values calculated by the candidate value calculation unit 302*b*. Specifically, based on the pixel value of the pixel of interest on the RAW image, the plurality of candidate values calculated by the candidate value calculation unit 302*b*, and the representative value calculated by the representative value calculation unit 302*c*, the correction value calculation unit 302*e* calculates a pixel value for which the RTS noise has been corrected, and outputs the pixel value to the image processing unit 303. More specifically, the correction value calculation unit 302*e* corrects the pixel value of the pixel of interest based on the candidate value that causes a correction result to come closest to the representative value calculated by the representative value calculation unit 302*c*, among the plurality of candidate values calculated by the candidate value calculation unit 302*b*. In contrast, in a case where the RTS noise pixel determination unit 302*a* has determined that the pixel is a pixel on which RTS noise does not occur on the pixel of interest, the correction value calculation unit 302*e* outputs the pixel value of the pixel of interest on the RAW image, without any change.

The image processing unit 303 performs predetermined image processing onto the image data for which RTS noise has been corrected by the RTS noise correction unit 302, and outputs the processed data to the display device 40. The predetermined image processing herein corresponds to basic image processing including at least optical black subtraction processing, white balance adjustment processing, and including synchronization processing of the image data, color matrix calculation processing, γ correction processing, color reproduction processing, edge enhancement processing, and noise reduction processing, in a case where the image sensor is arranged in a Bayer array. Moreover, the image processing unit 303 performs image processing of reproducing a natural image based on individual image processing parameters that have been set beforehand. The parameters of image processing are values of contrast, sharpness, saturation, white balance, and gradation.

Configuration of Display Device

Next, the configuration of the display device 40 will be described. The display device 40 displays an image that corresponds to the image data input from the second image processing apparatus 30. The display device 40 includes a display panel of liquid crystal, organic electroluminescence (EL), or the like.

On the above-configured imaging system 1, the first image processing apparatus 20 detects RTS noise that occurs on the image sensor 105, the second image processing apparatus 30 corrects the RTS noise detected by the first image processing apparatus 20, and the display device 40 displays the image that corresponds to the image data image-processed by the second image processing apparatus 30.

Causes for Occurrence of RTS Noise and Characteristics of RTS Noise

Next, causes for occurrence of the RTS noise and characteristics of the RTS noise will be described.

Figure 3:
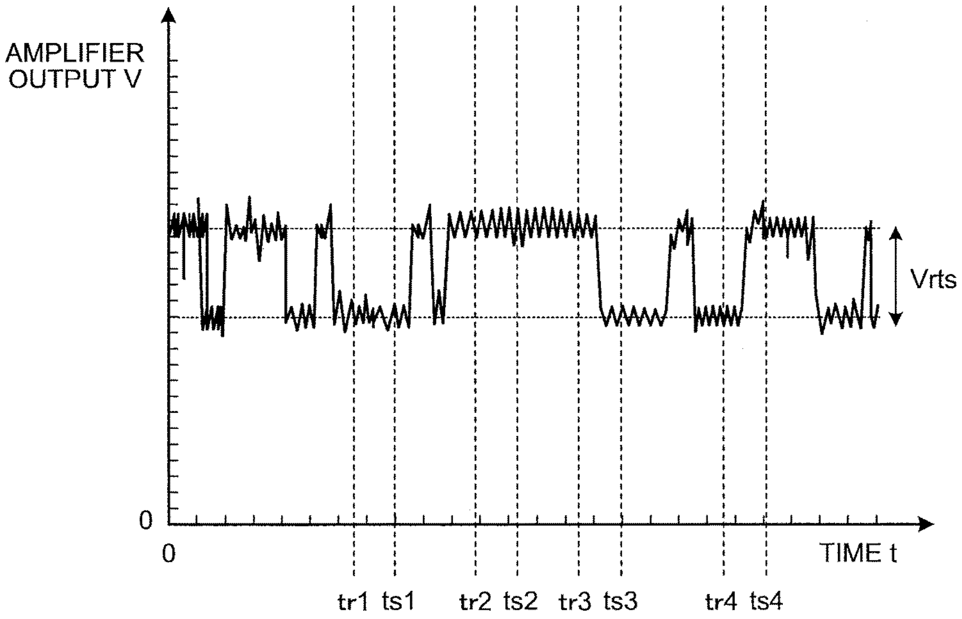
FIG. 3 is a diagram illustrating variation of amplifier output from an amplifier unit at the time of occurrence of RTS noise in a case where light is shielded so as to avoid the light from reaching the image sensor according to the first embodiment of the present invention.

FIG. 3 is a diagram illustrating variation of amplifier output from the amplifier unit 105*e* at the time of occurrence of RTS noise in a case where light is shielded so as to avoid the light from reaching the image sensor 105. FIG. 4 is a diagram illustrating distribution of pixel values read out using the amplifier unit 105*e* on which RTS noise occurs.

In a case where a trap level is present on a gate oxide film of the amplifier unit 105*e*, RTS noise occurs when electrical charges are trapped or discharged at the trap level at random timings. Therefore, as illustrated in FIG. 3, amplifier output randomly varies in a range of approximately Vrts on the amplifier unit 105*e* on which RTS noise occurs. Moreover, variation in potential does not occur in an instant but requires a slight length of time $\tau$.

In a typical case of the image sensor 105, correlated double sampling processing (hereinafter, referred to as CDS processing) is performed in order to reduce noise from the pixel value read out from the pixel 105*a*. In the CDS processing, the imaging controller 114 turns on a reset switch (not illustrated) of the image sensor 105 so as to reset the electrical charges of the FD unit 105*d*, and furthermore, the imaging controller 114 turns on the second switch 105*f* to produce a reset state, and reads out (outputs) a signal (reference signal) in the reset state. Next, in CDS processing, the imaging controller 114 turns on the first switch 105*b* (or any of first switches 105*b*(1) to 105*b*(8)) alone so as to transfer the electrical charges generated on the pixel 105*a* to the FD unit 105*d*, and furthermore, turns on the second switch 105*f* to come into a read-out state (output state) and reads out (outputs) a signal in the read-out state. Subsequently, in the CDS processing, the signal obtained by subtracting a reset state signal (reference signal) from the read-out signal is converted as a pixel value.

As illustrated in FIG. 3, when the image sensor 105 reads out individual signals of a timing tr1 (reset state) and a timing ts1 (read-out state) by the CDS processing, individual amplifier output values V for the timing tr1 and the timing ts1 are substantially similar to each other. Accordingly, the image sensor 105 receives mainly an effect of random noise, resulting in the pixel values that have been read out taking a form of distribution A around zero, as illustrated in FIG. 4. Similarly, even in a case of a timing tr2 (reset state) and a timing ts2 (read-out state) on the image sensor 105, individual amplifier output values V for the timing tr2 and the timing ts2 are substantially similar to each other. As a result, the pixel values that have been read out take a form of the distribution A illustrated in FIG. 4.

The image sensor 105 reads out individual signals at a timing tr3 (reset state) and a timing ts3 (read-out state) by CDS processing. At this time, the amplifier output of the timing ts3 is lower than the amplifier output of the timing tr3 by approximately Vrts. Accordingly, due to a difference between the two signals, a shift occurs in the negative direction by RTS_Value, that is, the pixel value that corresponds to Vrts, which is the change amount of amplifier output, resulting in distribution B in which read out pixel values are distributed around −RTS_Value.

In contrast, the image sensor 105 reads out individual signals at a timing tr4 (reset state) and a timing ts4 (read-out state) by CDS processing. At this time, the amplifier output of the timing ts4 is higher than the amplifier output of the timing tr4 by approximately Vrts. Accordingly, due to a difference between the two signals, a shift occurs in the positive direction by RTS_Value, that is, the pixel value that corresponds to Vrts, which is the change amount of amplifier output, resulting in distribution C in which read out pixel values are distributed around RTS_Value.

Herein, since the occurrence of variation of amplifier output in FIG. 3 needs the length of time $\tau$, there may be a case where a signal is read out during variation of the potential. In this case, an amplifier output difference is greater than −Vrts and smaller than Vrts, between reset state read out timing and read-out-state read-out timing. As a result, the pixel value read out from the image sensor 105 is also greater than −RTS_Value and smaller than RTS_Value. Since the length of time $\tau$ is considered to be substantially constant provided that the conditions (for example, temperature and drive voltage) of the image sensor 105 is constant, the pixel value greater than −RTS_Value and smaller than RTS_Value occurs with a similar probability. Herein, the frequency of occurrence of these pixel values is defines as αnoise. Moreover, while having different median values, distribution B and distribution C are similar distributions other than the median value. Accordingly, hereinafter, the ratio of distribution B or distribution C to distribution A will be defined as αrts. The shorter the amplifier output variation cycle of the amplifier unit 105*e*, the greater αrts.

In this manner, the pixel value read out by CDS processing using the amplifier unit 105*e* involving occurrence of RTS noise results in the distribution illustrated in FIG. 4. Under the condition where light is applied to the image sensor 105, the potential in the read-out state changes in accordance with the exposure amount. The change in the potential due to RTS noise, however, is constant independently from the exposure amount. That is, the RTS noise has a characteristic of randomly varying with respect to a normal pixel value within a range not less than −RTS_Value and not greater than RTS_Value, independently from the exposure amount. While FIG. 4 schematically illustrates distribution A, distribution B, and distribution C, distribution typically takes a form of normal distribution.

Moreover, since the RTS noise is noise attributed to the read-out circuit (amplifier unit 105*e*), in a case where each of the plurality of pixels 105*a* shares one read-out circuit as illustrated in FIG. 2, RTS noise with a similar characteristic occurs on all sharing pixels (pixel 105*a*(1) to 105*a*(8)).

Moreover, the RTS noise might occur also in cases other than the read-out circuit (amplifier unit 105*e*), illustrated in FIG. 2, that is, in a column amplifier and a source follower, or the like, shared in a column direction of the image sensor 105. In this case, RTS noise with a similar characteristic occurs also on all pixels, in the column direction, sharing a same column amplifier and a source follower. In the present embodiment, application is possible to the RTS noise occurred in the circuit other than the read-out circuit (amplifier unit 105*e*).

In this manner, the RTS noise is a type of blinking defect noise that involves amplitude (variation) of the pixel value of the image obtained by shooting, within a fixed range (not less than −RTS_Value and not greater than RTS_Value) in a case where a fixed subject is shot under a same condition.

Figure 5:
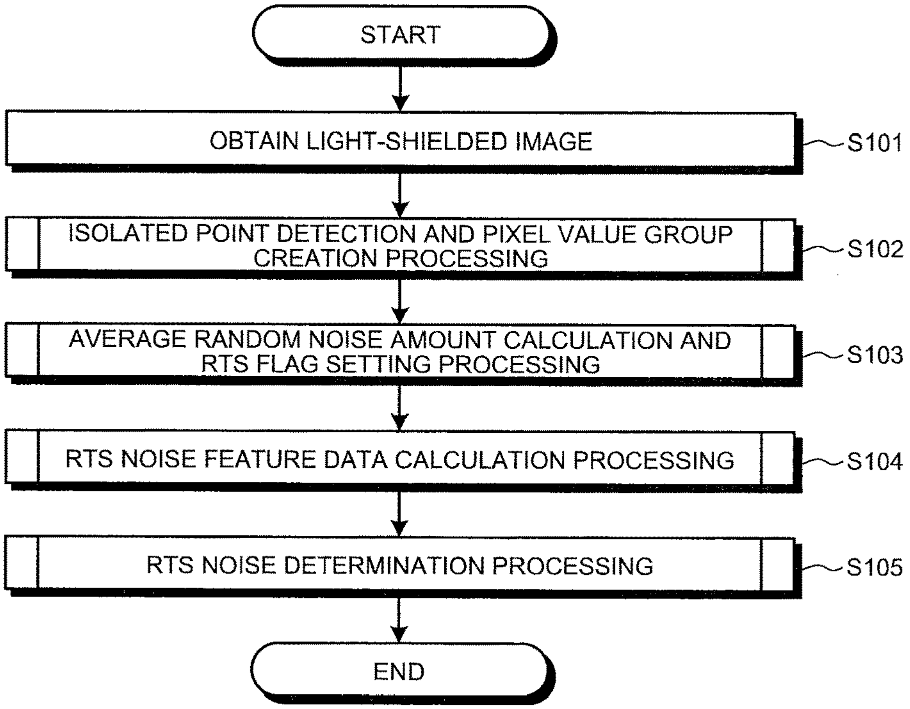
FIG. 5 is a flowchart illustrating outline of processing executed by a first image processing apparatus according to the first embodiment of the present invention.

Processing on First Image Processing Apparatus Next, processing of the first image processing apparatus 20 will be described FIG. 5 is a flowchart illustrating an outline of processing executed by the first image processing apparatus 20, that is, a flowchart of a main routine executed by the first image processing apparatus 20. With FIG. 5, RTS noise detection processing of detecting RTS noise, executed by the first image processing apparatus 20 will be described.

As illustrated in FIG. 5, the RTS noise detection unit 202 outputs an instruction signal to shoot a light-shielded image, to the imaging controller 114 via the second external I/F unit 201 and the first external I/F unit 115, and causes the imaging controller 114 to shoot a plurality of (for example, 250) dark-time RAW images (step S101). In this case, the imaging controller 114 causes the image sensor 105 to shoot the dark-time RAW image by controlling the shutter 103 and the image sensor 105 based on the instruction signal input from the RTS noise detection unit 202. At this time, in a case where the RAW image size and the drive mode (for example, high-speed read-out mode or image quality preference mode) of the image sensor 105 at shooting are different, and in a case where the characteristics of the RAW image (for example, bit number) are different, in each of a still image, a moving image, or a live-view image, it is preferable that the image sensor 105 shoots a plurality of dark-time RAW images for each of individual cases. Moreover, the imaging controller 114 outputs the plurality of dark-time RAW images captured by the image sensor 105, to the RTS noise detection unit 202, via the bus 113, the first external I/F unit 115, and the second external I/F unit 201.

The RAW image data to be output to the RTS noise detection unit 202 need not be a dark-time RAW image, that is, it is possible to detect RTS noise with a plurality of pieces of RAW image data obtained by shooting the same subject. It would be preferable, however, to use a dark-time RAW image because the degree of effects of random noise decreases in dark in typical cases. For similar reasons, as the RAW image data to be output to the RTS noise detection unit 202, it may be more preferable to shoot, with the image sensor 105, a plurality of dark-time RAW images in low temperature (room temperature or below) rather than high temperature, because random noise is less in the low temperature. Moreover, RAW image data to be output to the RTS noise detection unit 202 need not be a plurality of pieces of RAW image data constituted with the signal output from each of the plurality of pixels 105*a*, but may be a plurality of pieces of RAW image data constituted with a signal output solely from the FD unit 105*d*.

Subsequently, the RTS noise detection unit 202 executes isolated point detection and pixel value group creation processing (step S102) that includes detection of an isolated point (defective pixel) and creation of a plurality of pixel value groups using a plurality of dark-time RAW images obtained from the imaging apparatus 10.

Figure 6:
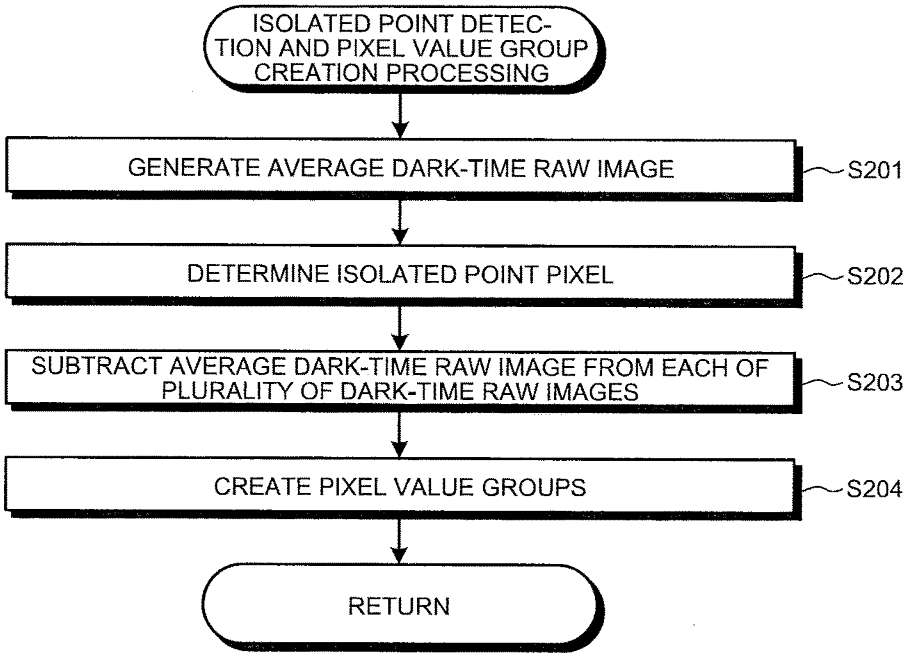
FIG. 6 is a flowchart illustrating an outline of isolated point detection and pixel value group creation processing in FIG. 5.

FIG. 6 is a flowchart illustrating an outline of isolated point detection and pixel value group creation processing in step S102 in FIG. 5.

As illustrated in FIG. 6, the isolated point detection unit 202*a* first generates (step S201) an average dark-time RAW image, that is, an average of the plurality of dark-time RAW images obtained in above-described step S101. Specifically, the isolated point detection unit 202*a* generates the average dark-time RAW image by first adding pixel values of all dark-time RAW images for each of the pixels, and then dividing the sum by the number (for example, 250) of dark-time RAW images. With this processing, it is possible to reduce the effects of random noise and RTS noise in the average dark-time RAW image. The isolated point detection unit 202*a* may generate the average dark-time RAW image using solely a portion of the dark-time RAW image shot in step S101 described above. This could reduce the time to create the average dark-time RAW image.

Moreover, under the condition where the image sensor 105 has stable characteristics, the isolated point detection unit 202*a* may generate the average dark-time RAW image using another dark-time RAW image shot in a timing that differs from the timing of the case of shooting in step S101 described above. Accordingly, with above-described steps S101 and S201 performed in parallel, or with above-described step S101 performed in parallel with steps S203 and S204 described below, the isolated point detection unit 202*a* need not store all the dark-time RAW images shot in above-described step S101, in the non-volatile memory 112, making it possible to create a pixel value group even with the volatile memory 111 with low capacity.

Subsequently, the isolated point detection unit 202*a* determines an isolated point pixel based on the average dark-time RAW image (step S202). Specifically, the isolated point detection unit 202*a* determines whether the pixel value of each of the pixels constituting an average dark-time RAW image is a predetermined threshold (first threshold) or above, and then, determines (detects) this pixel having the pixel value of the determined threshold (first threshold) or above as an isolated point (defective pixel). The predetermined threshold is, for example, approximately double the pixel value of dark-time shot noise. This enables accurate detection (determination) of the isolated point pixel (defective pixel) having a possibility of lowering RTS noise detection accuracy. While the isolated point detection unit 202*a* detects the pixel that outputs the pixel value greater than the predetermined threshold (first threshold) as a white spot pixel, as an isolated point pixel, the isolated point detection unit 202*a* may detect a black spot pixel, for example, having a pixel value smaller than a predetermined threshold (second threshold). The black spot pixel is attributed to poor sensitivity, that is, a case where the sensitivity is lower than the sensitivity of surrounding pixels, defective photodiode (pixel 105*a*), or the like. In a case where the cause is poor sensitivity, this pixel would not affect the RTS noise detection due to the use of a dark-time RAW image, even without being detected as an isolated point pixel. However, in a case where the cause is in the pixel 105*a*, it would be preferable that the pixel is detected similarly to the above-described white spot. Accordingly, in addition to the detection of the white spot pixel, the isolated point detection unit 202*a* may further detect a pixel having a pixel value not greater than the predetermined value (second threshold) as a black spot pixel based on a plurality of images obtained by shooting a uniform subject. This processing can enhance RTS noise detection accuracy.

Thereafter, the pixel value group creation unit 202*b* subtracts the average dark-time RAW image from each of the plurality of dark-time RAW images (step S203). Specifically, the pixel value group creation unit 202*b* subtracts a pixel value of a pixel on an average dark-time RAW image from the pixel value of each of the pixels constituting each of the dark-time RAW images. In this case, the pixel value group creation unit 202*b* also retains a negative value in a result of subtraction. Moreover, the image sensor 105 typically includes an OB area (OB pixel) for performing offset detection (optical black detection) for electrical charges including dark current. Accordingly, the pixel value group creation unit 202*b* may subtract the average of the pixel values in the OB area from each of the plurality of dark-time RAW images. Using the average dark-time RAW image can exclude effects of shading, or the like due to variation of dark current of each of the pixels, and thus can detect RTS noise further accurately.

Subsequently, based on an isolated point pixel determination result obtained by detection by the isolated point detection unit 202*a* in step S202 and based on the plurality of dark-time RAW images from which the average dark-time RAW image has been subtracted in step S203, the pixel value group creation unit 202*b* classifies the pixel values for each of the read-out circuits (amplifier units 105*e*) and creates a plurality of pixel value groups (step S204). Specifically, the pixel value group creation unit 202*b* first excludes a pixel value output from the pixel determined as the isolated point pixel from the pixel values of all the pixels of the plurality of dark-time RAW images from which the average dark-time RAW image has been subtracted. Next, the pixel value group creation unit 202*b* creates groups for each of the pixel values output from the pixel read out using the same read-out circuit (amplifier unit 105*e*) and defines these groups as individual pixel value groups.

Figure 7:
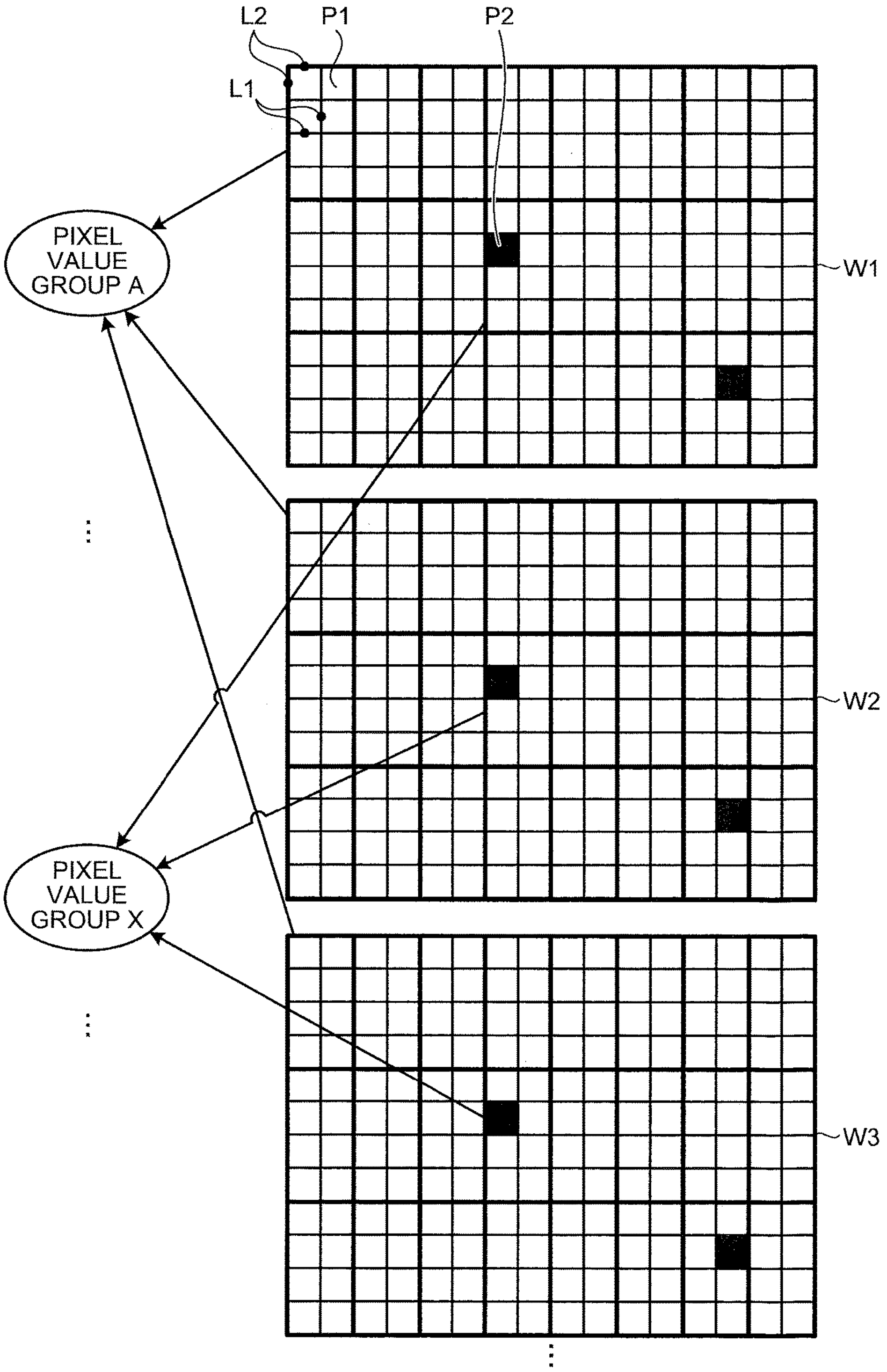
FIG. 7 is a diagram schematically illustrating a pixel of an image sensor that outputs a pixel value classified into a same pixel value group.

FIG. 7 is a diagram schematically illustrating a pixel of the image sensor 105 that outputs a pixel value classified into a same pixel value group. FIG. 7 illustrates a case of sharing pixels in which a signal is read out by one read-out circuit (amplifier unit 105*e*) for eight pixels, that is, two pixels in the lateral direction×four pixels in the longitudinal direction, illustrated in FIG. 2. Moreover, in FIG. 7, a square P1 formed with a thin line L1 indicates each of pixels, specifically, the white square P1 indicates a normal pixel while a black square P2 indicates an isolated point pixel Furthermore, in FIG. 7, a frame formed with a thick line L2 represents a pixel that outputs a pixel value classified into a same pixel value group. Moreover, FIG. 7 illustrates, in an order from the top, a portion of an image shot in a W1-th time, a portion of an image shot in a W2-th time, and a portion of an image shot in a W3-th time.

As illustrated in FIG. 7, a pixel value group A is a set of pixel values output from each of the pixels in the thick frame portion L2 on the upper left, on each of the plurality of the dark-time RAW images from which the pixel value group creation unit 202*b* has subtracted the average dark-time RAW image. In this case, when 250 dark-time RAW images are used, for example, the pixel value group A would be a set of 8×250=2000 pixel values. Moreover, a pixel value group X is a set of pixel values output from the pixels with no detected isolated point (defective pixel), among the pixels within the thick frame portion. In this case, when 250 dark-time RAW images are used, for example, the pixel value group X would be a set of (8−1)×250=1750 pixel values.

After step S204, the RTS noise detection unit 202 returns to the main routine in FIG. 5.

Returning to FIG. 5, description of step S103 and subsequent steps follows below.

In step S103, the RTS noise detection unit 202 performs average random noise amount calculation and RTS flag setting processing on a plurality of pixel value groups. The average random noise amount calculation and RTS flag setting processing includes setting of an RTS flag indicating the possibility of occurrence of the RTS noise, and calculation of the average random noise amount of a pixel value group.

Figure 8:
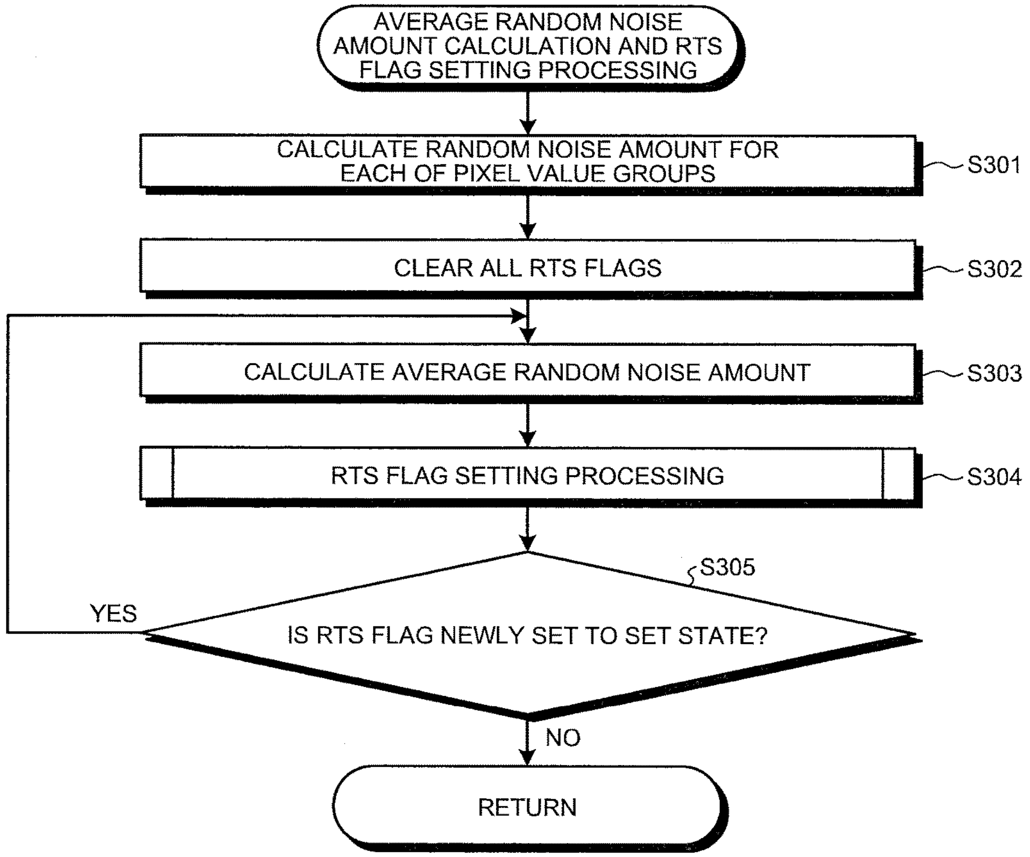
FIG. 8 is a flowchart illustrating an outline of average random noise amount calculation and RTS flag setting processing in FIG. 5.

FIG. 8 is a flowchart illustrating an outline of average random noise amount calculation and RTS flag setting processing illustrated in step S103 in FIG. 5.

As illustrated in FIG. 8, the average random noise amount calculation unit 202*c* first calculates the random noise amount of each of the pixel value groups (step S301). Specifically, the average random noise amount calculation unit 202*c* calculates a single value for the random noise amount for a single pixel value group. In the first embodiment, the average random noise amount calculation unit 202*c* calculates standard deviation of the pixel values constituting a pixel value group, and calculates the standard deviation as the random noise amount of each of the pixel value groups. For example, the average random noise amount calculation unit 202*c* calculates standard deviation of 2000 pixel values in the case of the pixel value group A, and calculates standard deviation of 1750 pixel values in the case of the pixel value group X, as illustrated in FIG. 7. Alternatively, the average random noise amount calculation unit 202*c* may calculate a value as the random noise amount using other scales such as a maximum value, a minimum value, a difference between the maximum and minimum values, or a dispersion value.

Subsequently, the average random noise amount calculation unit 202*c* sets the RTS flag to a clear state for each of pixel value group (step S302). The RTS flag is information that accompanies each of the pixel value group. The clear state of the RTS flag indicates no possibility of occurrence of RTS noise in the corresponding pixel value group, while the set state of the RTS flag indicates possibility of occurrence of the RTS noise in the corresponding pixel value group.

Thereafter, the average random noise amount calculation unit 202*c* calculates an average of the average random noise amounts of all the pixel value groups for which the RTS flag is set to the clear state (step S303). Specifically, the average random noise amount calculation unit 202*c* calculates the average of the standard deviation of the pixel value group for which the RTS flag calculated in step S301 is set to the clear state, as the random noise amount of the plurality of dark-time RAW images, and defines the calculation result as the average random noise amount.

Subsequently, the average random noise amount calculation unit 202*c* compares the random noise amount with the average random noise amount, in the pixel value group, for each of the pixel value group for which the RTS flag is set to the clear state. Then, the average random noise amount calculation unit 202*c* executes RTS flag setting processing, specifically, sets the RTS flag to the set state when the random noise amount is greater (step S304).

Figure 9:
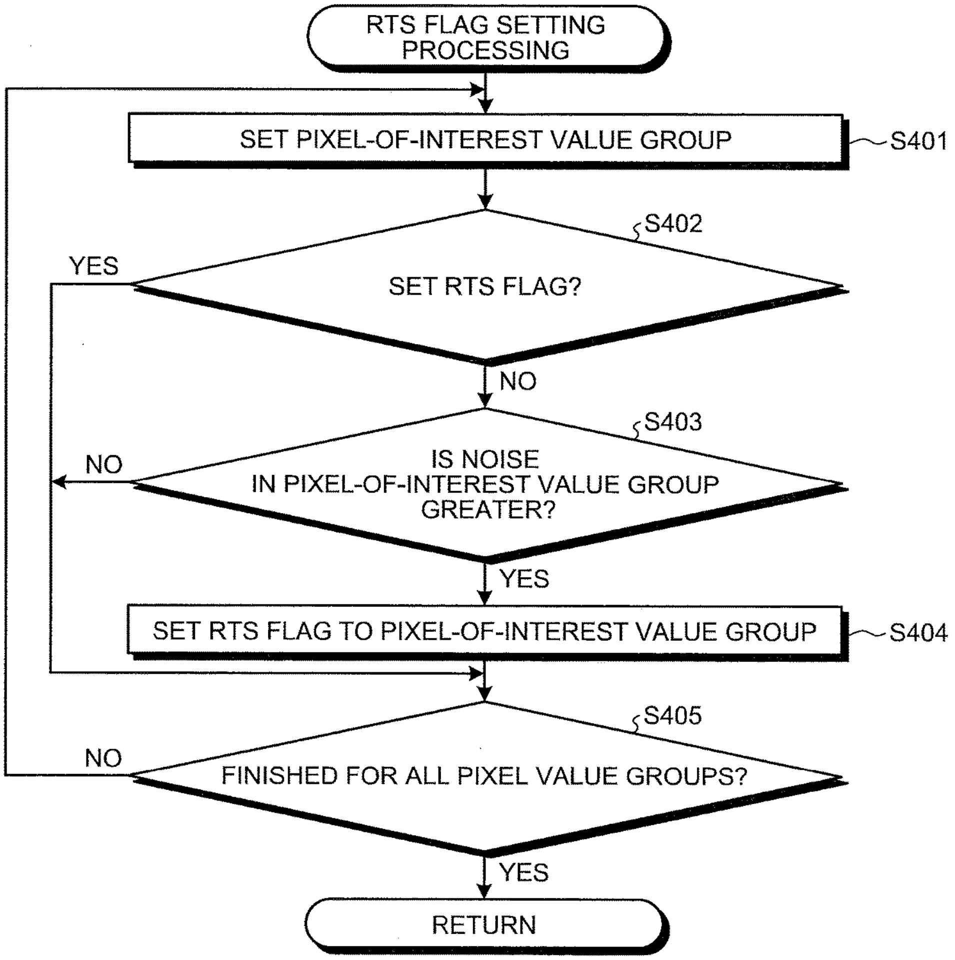
FIG. 9 is a flowchart illustrating an outline of processing in the RTS flag setting processing in FIG. 8.

FIG. 9 is a flowchart illustrating an outline of processing in the RTS flag setting processing in step S304 in FIG. 8.

As illustrated in FIG. 9, the average random noise amount calculation unit 202*c* first sets (step S401) a pixel-of-interest value group needed for sequentially processing of steps S402 to S404 described below (that is, sets a pointer for specifying a group that executes processing of steps S402 to S404, described below). Specifically, the average random noise amount calculation unit 202*c* allocates integers greater than zero, in the raster order, such as 1, 2, 3 . . . from upper left to lower right, as an index, for each of sharing pixel blocks (for each of read-out circuits) on the image sensor 105. Next, the average random noise amount calculation unit 202*c* increments a counter by one every time step S401 is executed (the counter is reset to zero at the point when the RTS flag setting processing is started). The average random noise amount calculation unit 202*c* sets a pixel value group to which the index indicated by the counter is allocated, as the pixel-of-interest value group. That is, when step S401 is first executed by the average random noise amount calculation unit 202*c*, the average random noise amount calculation unit 202*c* increments the counter, which has been reset to zero, by one. Accordingly, the counter indicates one and the pixel value group in the upper left portion becomes the pixel-of-interest value group. When the average random noise amount calculation unit 202*c* executes processing of step S401 twice (second time), the counter indicates two. Accordingly, the pixel value group on the right side of the upper left pixel value group becomes the pixel-of-interest value group.

Subsequently, the average random noise amount calculation unit 202*c* determines whether the RTS flag of the pixel of interest group is in the set state (step S402). In a case where the average random noise amount calculation unit

202*c* determines that the RTS flag of the pixel of interest group is in the set state (step S402: Yes), the first image processing apparatus 20 proceeds to step S405 described below. In contrast, in a case where the average random noise amount calculation unit 202*c* determines that the RTS flag of the pixel of interest group is not in the set state (step S402: No), the first image processing apparatus 20 proceeds to step S403 described below.

In step S403, the average random noise amount calculation unit 202*c* determines whether the random noise amount of the pixel-of-interest value group is greater the average random noise amount. Specifically, the average random noise amount calculation unit 202*c* determines whether the standard deviation of the pixel-of-interest value group is greater than a value obtained by multiplying the average of the standard deviation of the average random noise amount by a predetermined coefficient (for example, 1.5). In a case where the average random noise amount calculation unit 202*c* determines that the random noise amount of the pixel-of-interest value group is greater the average random noise amount (step S403: Yes), the first image processing apparatus 20 proceeds to step S404 described below. In contrast, in a case where the average random noise amount calculation unit 202*c* determines that the random noise amount of the pixel-of-interest value group is not greater the average random noise amount (step S403: No), the first image processing apparatus 20 proceeds to step S405 described below.

In step S404, the average random noise amount calculation unit 202*c* sets the RTS flag of the pixel-of-interest value group to the set state.

Subsequently, the average random noise amount calculation unit 202*c* determines, for all the pixel value groups, whether the processing in above-described steps S401 to S404 is finished (step S405). In a case where the average random noise amount calculation unit 202*c* determines, for all the pixel value groups, that processing of above-described steps S401 to S404 is finished (step S405: Yes), the first image processing apparatus 20 returns to the average random noise amount calculation and RTS flag setting processing in FIG. 8. In contrast, in a case where the average random noise amount calculation unit 202*c* determines that the processing in above-described steps S401 to S404 is not finished (step S405: No), the first image processing apparatus 20 returns to above-described step S401.

Returning to FIG. 8, description of step S305 and subsequent steps follows below.

In step S305, the average random noise amount calculation unit 202*c* determines whether the RTS flag has been newly set to the set state in the RTS flag setting processing in above-described step S304. Specifically, the average random noise amount calculation unit 202*c* determines whether processing of step S404 in FIG. 9 has been executed one or more times in the processing of step S304 previously executed. In a case where the average random noise amount calculation unit 202*c* determines that the RTS flag has been newly set to the set state (processing of step S404 in FIG. 9 has been executed one or more times in the processing of step S304 previously executed) (step S305: Yes), the first image processing apparatus 20 returns to step S303. In contrast, in a case where the average random noise amount calculation unit 202*c* determines that the RTS flag has not been newly set to the set state (processing of step S404 in FIG. 9 has not been executed in the processing of step S304 previously executed) (step S305: No), the first image processing apparatus 20 returns to the main routine in FIG. 5. While the average random noise amount calculation unit 202*c* performs determination, in step S305, by the number of times of execution of step S404 in above-described FIG. 9, it is also possible to determine whether the number of times of execution of above-described steps S403 to S405 has reached a predetermined number of times, for example, three times.

In this manner, when the average random noise amount calculation unit 202*c* executes processing illustrated in above-described FIGS. 8 and 9, RTS flags of all the pixel value groups are set to the clear state in above-described step S302, and it is possible to calculate the average random noise amount of all the pixel value groups by executing initially described step S303. The random noise amount is great in the pixel value group in which the RTS noise occurs. Accordingly, the average random noise amount calculation unit 202*c* performs comparison with the average random noise amount in above-described step S304, thereby setting the RTS flag to the set state for the pixel value group in which RTS noise occurs.

The random noise amount of the pixel value group having small RTS_Value, however, has a smaller difference when compared with the random noise amount of the pixel value group in which the RTS noise does not occur. Therefore, in some cases, the RTS flag cannot be properly set (properly set to the set state) on the pixel value group having small RTS_Value merely by the execution of above-described step S303 and step S304 once by the average random noise amount calculation unit 202*c*. To cope with this, the first embodiment causes the average random noise amount calculation unit 202*c* to repeat above-described steps S303 to S305, thereby enabling setting of the RTS flag on the pixel value group having small RTS_Value. Furthermore, it is possible to gradually converge the average random noise amount. As a result, this enables the average random noise amount calculation unit 202*c* to set the RTS flag to the set state for all the pixel value groups having RTS noise of a level discernable from the random noise. In contrast, the RTS flag remains to be set to the clear state in all the pixel value groups having RTS noise of a level indiscernible from the random noise. Nevertheless, since this type of RTS noise is buried among the random noise, it need not be detected or corrected.

Moreover, as illustrated in FIG. 3 described above, since distribution is produced on the pixel values shifted by RTS_Value due to RTS noise in the pixel value group in which RTS noise occurs, the standard deviation is increased. Since there is a low possibility of occurrence of the RTS noise in all of the read-out circuits (amplifier unit 105*e*), it is possible to reliably classify the pixel value groups into the pixel value group having possibility of occurrence of RTS noise that needs detection and correction, and the pixel value group having no possibility of occurrence of RTS noise that needs detection and correction, by execution of the processing illustrated in above-described FIGS. 8 and 9 by the average random noise amount calculation unit 202*c*.

Returning to FIG. 5, description of step S104 and subsequent steps follows below.

In step S104, the RTS noise detection unit 202 executes RTS noise feature data calculation processing (step S104) of calculating the RTS feature data representing feature of the RTS noise, onto the pixel value group in which the RTS flag has been set to the set state in step S103.

Figure 10:
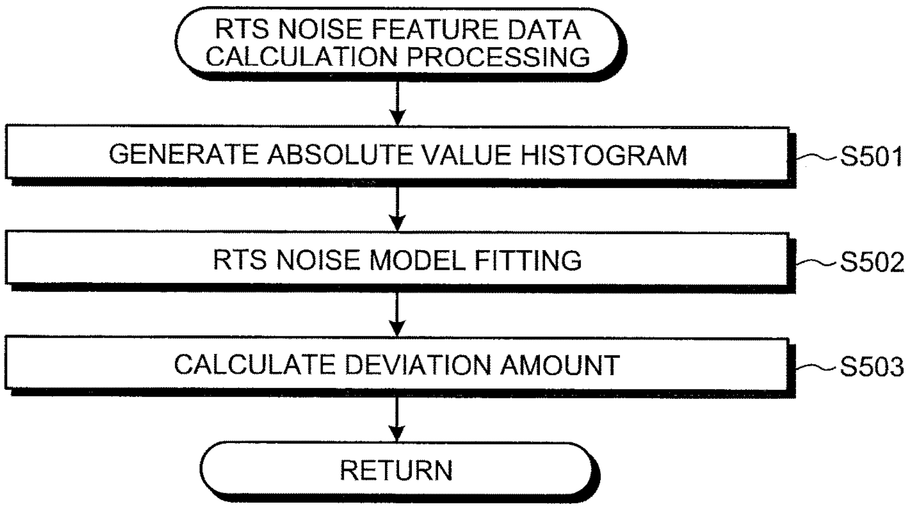
FIG. 10 is a flowchart illustrating an outline of RTS feature data calculation processing in FIG. 5.

FIG. 10 is a flowchart illustrating an outline of RTS noise feature data calculation processing in step S104 in FIG. 5.

Figure 11:
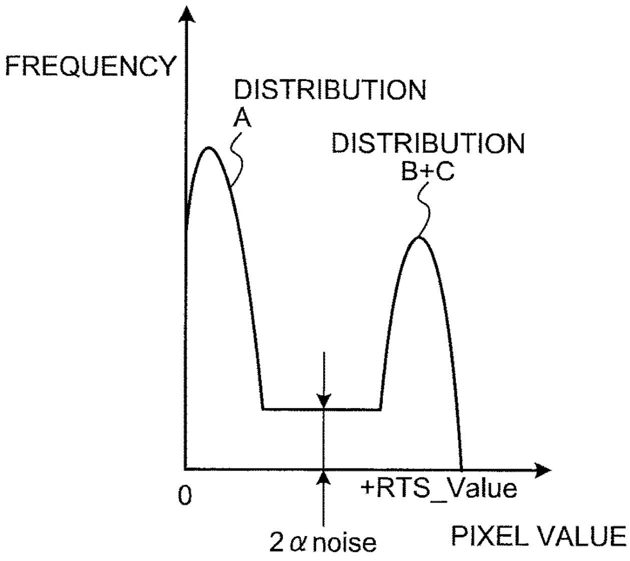
FIG. 11 is a diagram illustrating an exemplary absolute value histogram.

As illustrated in FIG. 10, the RTS noise feature data calculation unit 202*d* first creates a histogram (step S501) in which each of the pixel values within a pixel value group has been converted into an absolute value, for each of the pixel value group in which the RTS flag has been set to the set state. Specifically, in a case where the distribution of the pixel value group takes a form illustrated in above-described FIG. 4, the RTS noise feature data calculation unit 202*d* performs conversion into absolute values and creates a histogram illustrated in FIG. 11. Distribution B+C is distribution obtained by combining distribution B with distribution C in FIG. 4, and thus, the total number of distribution A×αRTS×2 is equal to the total number of distribution B+C. Moreover, the distribution of the number below the RTS_Value due to RTS noise becomes 2×αnoise. The RTS noise feature data calculation unit 202*d* can bias the distribution by executing the processing of step S501, making it possible to obtain accurate distribution without increasing the number of dark-time RAW images.

Subsequently, the RTS noise feature data calculation unit 202*d* performs fitting on each of the pixel value groups in which the RTS flag has been set to the set state, with the RTS noise model, thereby calculating the RTS_Value (step S502). Specifically, when it is assumed that the random noise occurs with normal distribution of standard deviation σ, distribution f(x) in FIG. 4 can be expressed in Formulas (1) and (2) using a coefficient k to match the total number of the pixel value groups and accumulation of f(x).

$$f(x)=k\left[\frac{1}{\sqrt{2\pi\sigma^2}}\exp\left(-\frac{x^2}{2\sigma^2}\right)+\alpha RTS\left\{\frac{\exp\left[-\frac{(x-\mathrm{RTS\_Value})^2}{2\sigma^2}\right]}{\sqrt{2\pi\sigma^2}}+\frac{\exp\left[-\frac{(x+\mathrm{RTS\_Value})^2}{2\sigma^2}\right]}{\sqrt{2\sigma^2}}\right\}+\alpha noise\right] \quad (1)$$

(−RTS_Value ≦ x ≦ RTS_Value)

$$f(x)=k\left[\frac{1}{\sqrt{2\pi\sigma^2}}\exp\left(-\frac{x^2}{2\sigma^2}\right)+\alpha RTS\left\{\frac{\exp[-(x-\mathrm{RTS\_Value})^2]}{\sqrt{2\pi\sigma^2}}+\frac{\exp\left[-\frac{(x+\mathrm{RTS\_Value})^2}{2\sigma^2}\right]}{\sqrt{2\sigma^2}}\right\}\right] \quad (2)$$

(Outside the above-describe range)

While the range of occurrence of αnoise is defined as the range greater than −RTS_Value and smaller than RTS_Value, the value range of x described in Formula (1) includes equal signs. Here, the value range including equal signs is used in view of rounding in sampling in A/D conversion by the A/D converter 107. Accordingly, distribution g(x) in FIG. 11 results in Formula (3).

$$g(x)=\begin{cases} f(0) & \text{for } x=0 \\ 2f(x) & \text{for } x\neq 0 \end{cases} \quad (3)$$

In this manner, using the standard deviation σ, RTS_Value, αRTS, and αnoise as variables, the RTS noise feature data calculation unit 202*d* calculates g(x) with x being within a predetermined range (for example, 10-bit range of approximately twice the maximum value available within 0 to RTS_Value), and performs normalization, and then calculates the standard deviation σ, RTS_Value, αRTS, and αnoise, capable of obtaining a minimum error between the absolute value histogram and g(x). Specifically, using the standard deviation σ, RTS_Value, αRTS, and αnoise as variables, the RTS noise feature data calculation unit 202*d* refers to g(x) with x being within a predetermined range, sets k such that the total number of g(x) calculated within the above-described predetermined range matches with the total number of the pixel values included in the pixel value group, and then, calculates the standard deviation σ, RTS_Value, αRTS, and αnoise, capable of obtaining a minimum error between the absolute value histogram and g(x) (RTS_Value Calculation Method 1). As an alternative method for obtaining the error, the RTS noise feature data calculation unit 202*d* may obtain the value accumulated with weighting in accordance with the pixel value x, other than the value being simple accumulation of errors of individual pixel values x. Since the random noise occurs within the image sensor 105 in substantially a same manner, the standard deviation σ becomes a value around the average standard deviation calculated as the average random noise amount. Accordingly, it may be possible to use the average random noise amount, that is, it may be possible to use the standard deviation calculated in the end of step S303, as the standard deviation σ. This makes it possible to reduce the calculation amount.

After step S502, the RTS noise feature data calculation unit 202*d* calculates a deviation amount for each of the pixel value groups in which the RTS flag is set to the set state (step S503). Herein, a median value in a range that distributes with a predetermined ratio (e.g. approximately 0.1% to 0.2%) of the quantity included in the pixel value groups, from the greater pixel value, on the absolute value histogram, is defined as the deviation amount (when the predetermined ratio is assumed to be the number of pixel values included in the 1/pixel value group, the deviation amount matches with the maximum value of the pixel value group). In a case where αRTS is extremely small, there is a possibility that the RTS noise feature data calculation unit 202*d* has difficulty in calculating the RTS noise feature data merely with RTS noise model fitting in above-described step S502. Accordingly, it would be possible to avoid miscalculation of the RTS noise feature data by using the deviation amount. Alternatively, the average random noise amount calculation unit 202*c* may calculate the deviation amount for each of the pixel value groups in which the RTS flag is set to the set state, and may perform RTS flag setting using this deviation amount as the random noise amount of each of the pixel value groups. This can prevent false negative in detection of the RTS noise with extremely small αRTS. After step S503, the first image processing apparatus 20 returns to the main routine in FIG. 5.

Returning to FIG. 5, description of step S105 and subsequent steps follows below.

In step S105, the RTS noise detection unit 202 executes RTS determination processing. The RTS determination processing includes determination of whether RTS noise of the level requiring correction is occurring in each of the pixel value groups based on the RTS feature data of the pixel value group in which the RTS flag is set to the set state, and includes recording of RTS noise information into the non-volatile memory 112 of the imaging apparatus 10. The RTS noise information is information that associates a result of the determination with a position of the read-out circuit that corresponds to each of the pixel value groups (that is, position (address) of a sharing pixel block including the pixels 105*a* that share the read-out circuit). After step S105, the first image processing apparatus 20 finishes the current processing.

Figure 12:
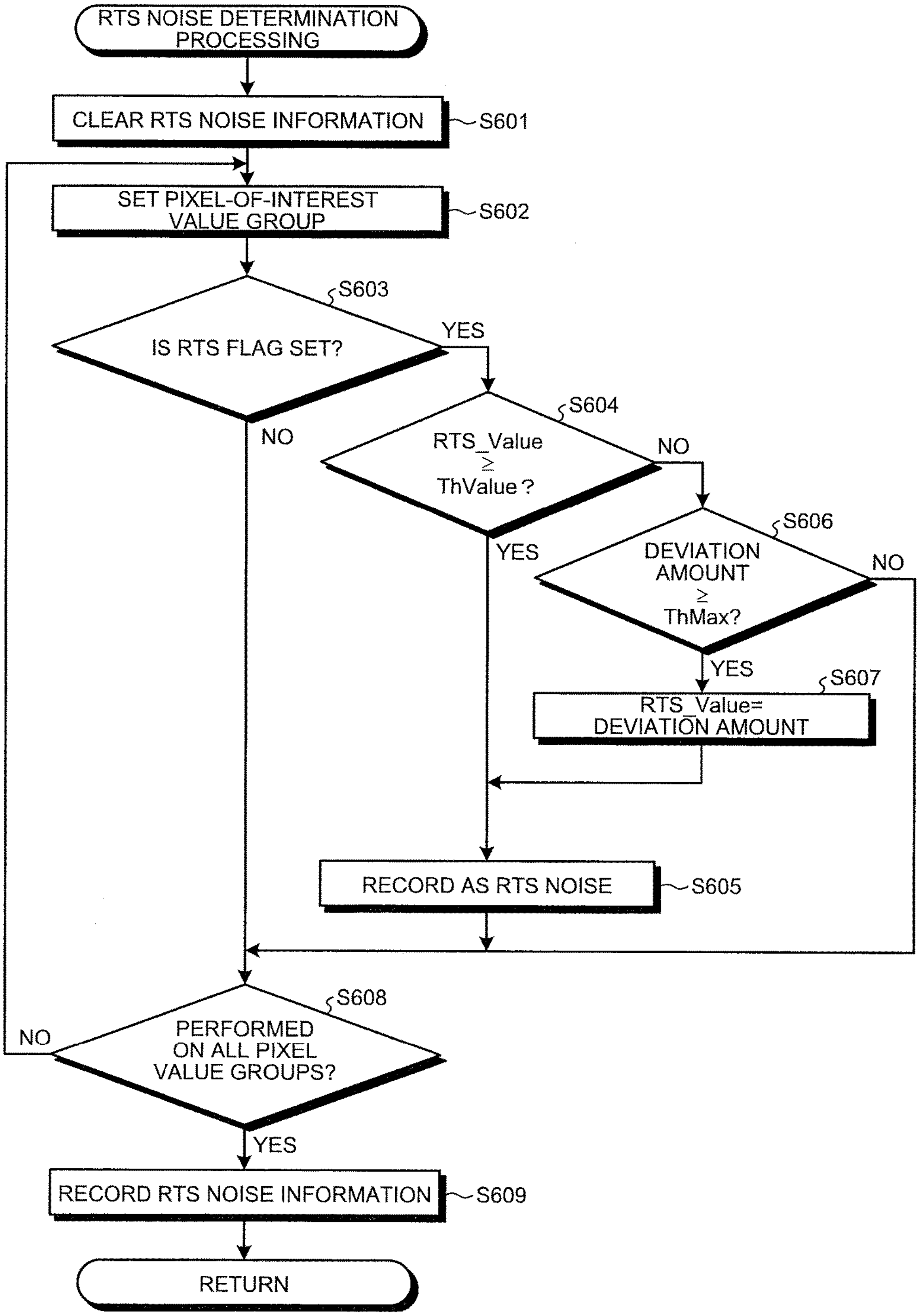
FIG. 12 is a flowchart illustrating an outline of RTS noise determination processing in FIG. 5.

FIG. 12 is a flowchart illustrating an outline of RTS noise determination processing of step S105 in FIG. 5.

As illustrated in FIG. 12, the RTS noise determination unit 202*e* first clears the RTS noise information recorded in the non-volatile memory 112 via the second external I/F unit 201, the first external I/F unit 115, and the bus 113 (step S601).

Subsequently, the RTS noise determination unit 202*e* sets a pixel-of-interest value group to be used for sequentially performing processing in steps S603 to S605 described below (step S602). Specifically, the RTS noise determination unit 202*e* sets a pointer for specifying a group that undergoes processing in steps S603 to S605 described below. For example, the RTS noise determination unit 202*e* allocates beforehand integers greater than zero, in the raster order, such as 1, 2, 3 . . . from upper left to lower right, as an index, for each of sharing pixel blocks on the image sensor 105. Next, the RTS noise determination unit 202*e* increments a counter by one every time step S602 is executed (counter is reset to zero at the point when the RTS noise determination processing in FIG. 12 is started). The pixel value group to which the index indicated by the counter is allocated is defined as the pixel-of-interest value group. That is, when step S602 is first executed by the RTS noise determination unit 202*e*, the RTS noise determination unit 202*e* increments the counter, which has been reset to zero, by one. Accordingly, the counter indicates one and the pixel value group in the upper left portion becomes the pixel-of-interest value group. When the RTS noise determination unit 202*e* executes processing of step S602 twice (second time), the counter indicates two. Accordingly, the pixel value group on the right side of the upper-left pixel value group becomes the pixel-of-interest value group.

Thereafter, the RTS noise determination unit 202*e* determines whether the RTS flag is set to the set state, for the pixel value group set as the pixel-of-interest value group (step S603). In a case where the RTS noise determination unit 202*e* determines that the RTS flag is set to the set state for the pixel value group set as the pixel-of-interest value group (step S603: Yes), the first image processing apparatus 20 proceeds to step S604 described below. In contrast, in a case where the RTS noise determination unit 202*e* determines that the RTS flag is not set to the set state for the pixel value group set as the pixel-of-interest value group (step S603: No), the first image processing apparatus 20 proceeds to step S608 described below.

In step S604, the RTS noise determination unit 202*e* determines whether the RTS_Value calculated by the RTS noise feature data calculation unit 202*d* in above-described step S502 in FIG. 10 is a predetermined value or above, that is, ThValue or above, for example. ThValue is a value obtained by multiplying the average random noise amount by a predetermined coefficient (for example, 2.0) since small RTS noise is unnoticeable by a human due to random noise. In step S604, the RTS noise determination unit 202*e* performs comparison between RTS_Value and ThValue. In a case where the RTS_Value is significantly different from the deviation amount, however, fitting by the RTS noise feature data calculation unit 202*d* might have failed in above-described step S502 in FIG. 10. Therefore, the RTS noise determination unit 202*e* may further perform determination whether the difference between the RTS_Value and the deviation amount is small. In a case where the RTS noise determination unit 202*e* determines that the RTS_Value is ThValue or above (step S604: Yes), the first image processing apparatus 20 proceeds to step S605 described below. In contrast, in a case where the RTS noise determination unit 202*e* determines that the RTS_Value is not ThValue or above (step S604: No), the first image processing apparatus 20 proceeds to step S606 described below.

In step S606, the RTS noise determination unit 202*e* determines whether the deviation amount of the pixel of interest group calculated by the RTS noise feature data calculation unit 202*d* in above-described step S503 is a predetermined value or above, for example, ThMax or above. Specifically, the RTS noise determination unit 202*e* performs determination by using the deviation amount in order to detect (determine) the RTS noise with a low frequency of occurrence. This is because in a case where the frequency of occurrence is low, the RTS noise is more unnoticeable by a human than the random noise. ThMax is preferably the value of ThValue or above. In a case where the RTS noise determination unit 202*e* determines that the deviation amount of the pixel of interest group is ThMax or above (step S606: Yes), the first image processing apparatus 20 proceeds to step S607 described below. In contrast, in a case where the RTS noise determination unit 202*e* determines that the deviation amount of the pixel of interest group is not ThMax or above (step S606: No), the first image processing apparatus 20 proceeds to step S608 described below.

In step S607, the RTS noise determination unit 202*e* sets the deviation amount of the pixel of interest calculated by the RTS noise feature data calculation unit 202*d* in above-described step S503, as the RTS_Value of the pixel-of-interest value group (value of deviation amount is duplicated as a value of RTS_Value). After step S607, the first image processing apparatus 20 proceeds to step S608.

Subsequently, the RTS noise determination unit 202*e* determines the RTS_Value as an RTS noise level, and associates the RTS_Value with positional information (address information) of the read-out circuit (amplifier unit 105*e*) that outputs a pixel value constituting the pixel value group set as the pixel-of-interest value group, that is, positional information (address information) of a sharing pixel block including solely pixels sharing the read-out circuit, and temporarily stores the associated information and the value in the volatile memory 111 of the imaging apparatus 10 (step S605).

Thereafter, the RTS noise determination unit 202*e* determines whether the setting of the pixel-of-interest value group and the processing in above-described steps S603 to S605 have been performed on all the pixel value groups (step S608). In a case where the RTS noise determination unit 202*e* determines that the setting and the processing have been performed on all the pixel value groups (step S608: Yes), the first image processing apparatus 20 proceeds to step S609 described below. In contrast, in a case where the RTS noise determination unit 202*e* determines that the setting and the processing have not been performed on all the pixel value groups (step S608: No), the first image processing apparatus 20 returns to step S602.

In step S609, the RTS noise determination unit 202*e* calculates a maximum value of the RTS_Value temporarily stored in the volatile memory 111 of the imaging apparatus 10 via the second external I/F unit 201, the first external I/F unit 115, and the bus 113, and calculates the histogram of the RTS_Value. Then, the RTS noise determination unit 202*e* associates the correspondence between the positional information of the sharing pixel block temporarily stored in the volatile memory 111 and the RTS_Value, the maximum value of the RTS_Value, and the histogram of the RTS_Value, with each other, and records them, as RTS noise information, into the RTS noise information recording unit 112*b* of the non-volatile memory 112. The correspondence between the positional information of the sharing pixel block and the RTS_Value means the positional information of the sharing blocks having possibility of occurrence of RTS noise and the RTS_Value for each of the sharing blocks. After step S609, the first image processing apparatus 20 returns to the main routine in FIG. 5 and the current processing is finished. The RTS noise determination unit 202*e* has associated the positional information of a sharing pixel block (positional information of read-out circuit (amplifier unit 105*e*)) and the RTS noise feature data with each other and recorded them as the RTS noise information, in the RTS noise information recording unit 112*b* of the non-volatile memory 112. Since each of the pixels belongs to any of the sharing pixel blocks, it may be possible to record as RTS noise information that associates positional information (pixel coordinate information) on each of the plurality of pixels and the RTS noise feature data with each other, in the non-volatile memory 112. In this case, since the number of pixels is the number of sharing pixel blocks or more, the amount of data to be recorded on the non-volatile memory 112 would be increased. However, there would be no need to consider the correspondence between each of the pixels and the sharing pixel block at correction of the RTS noise. Additionally, the RTS noise feature data include the correspondence of the RTS_Value, the maximum value of the RTS_Value, and the histogram of the RTS_Value.

Moreover, in above-described FIG. 12, while the RTS noise determination unit 202*e* first clears the RTS noise information recorded on the RTS noise information recording unit 112*b* of the non-volatile memory 112 of the imaging apparatus 10, and thereafter records the RTS noise information detected in above-described steps S602 to S607 into the non-volatile memory 112, the RTS noise is not always produced in the stage of production of the image sensor 105, but might be produced by aging and be increased gradually. Therefore, the RTS noise determination unit 202*e* may update the RTS noise information by adding newly detected RTS noise information, without clearing the RTS noise information recorded on the RTS noise information recording unit 112*b* of the non-volatile memory 112 of the imaging apparatus 10.

Processing on Second Image Processing Apparatus

Figure 13:
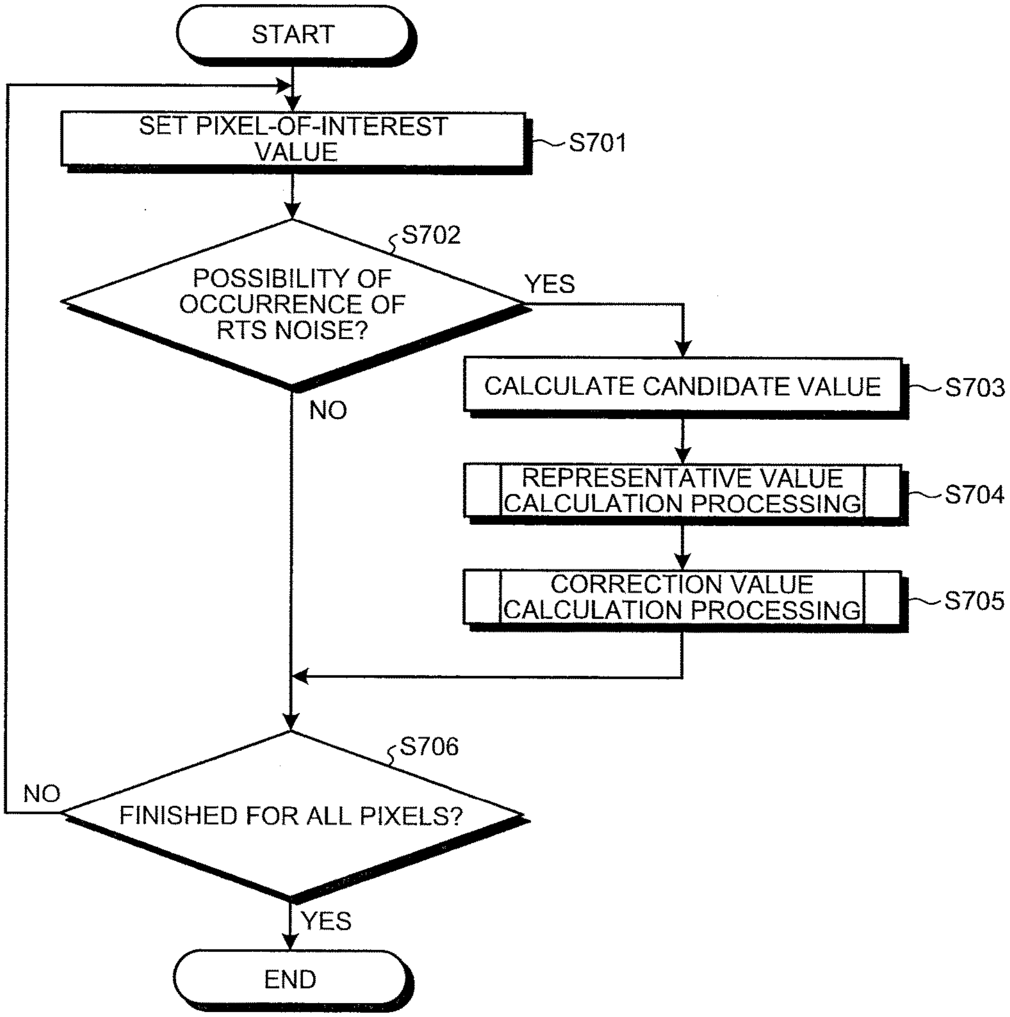
FIG. 13 is a flowchart illustrating outline of processing executed by a second image processing apparatus according to the first embodiment of the present invention.

Next, processing executed by the second image processing apparatus 30 will be described. FIG. 13 is a flowchart illustrating an outline of processing executed by the second image processing apparatus 30, that is, a flowchart of a main routine executed by the second image processing apparatus 30.

First, the RTS noise correction unit 302 sets a pixel of interest to be used for sequential execution of processing in steps S702 to S705 described below (step S701). The RTS noise correction unit 302 allocates integers greater than zero, in the raster order, such as 1, 2, 3 from upper left to lower right, as an index, for each of pixels on the RAW image. Next, the RTS noise correction unit 302 increments a counter by one every time step S701 is executed (counter is reset to zero at the point when the processing in FIG. 13 is started). The RTS noise correction unit 302 sets the pixel to which the index indicated by the counter is allocated, as a pixel of interest. That is, when step S701 is first executed by the RTS noise correction unit 302, the RTS noise correction unit 302 increments the counter, which has been reset to zero, by one. Accordingly, the counter indicates one and the pixel in the upper left portion becomes the pixel of interest. When the RTS noise correction unit 302 executes processing of step S701 twice (second time), the counter indicates two. Accordingly, the pixel on the right side of the upper left pixel becomes the pixel of interest.

Subsequently, the RTS noise pixel determination unit 302*a* obtains RTS noise information recorded in the RTS noise information recording unit 112*b* of the non-volatile memory 112 of the imaging apparatus 10 via the third external I/F unit 301, the first external I/F unit 115, and the bus 113, and determines whether there is a possibility that RTS noise is occurring in the pixel of interest, based on obtained RTS noise information (step S702). That is, the RTS noise pixel determination unit 302*a* determines whether the positional information of the sharing pixel block including the pixel of interest is included in the RTS noise information. Specifically, the RTS noise pixel determination unit 302*a* determines whether the positional information of the sharing block including the pixel of interest is included in the RTS noise information, as a sharing block having possibility of occurrence of the RTS noise. In a case where the RTS noise pixel determination unit 302*a* determines that there is a possibility of occurrence of RTS noise on the pixel of interest (determines that the positional information of the sharing pixel block including the pixel of interest is included in the RTS noise information) (step S702: Yes), the second image processing apparatus 30 proceeds to step S703 described below. In contrast, in a case where the RTS noise pixel determination unit 302*a* determines that there is no possibility of occurrence of RTS noise on the pixel of interest (determines that the positional information of the sharing pixel block including the pixel of interest is not included in the RTS noise information) (step S702: No), the second image processing apparatus 30 proceeds to step S706 described below. In this case, in a case where the RTS noise pixel determination unit 302*a* determines that there is no possibility that RTS noise is occurring on the pixel of interest, the RTS noise pixel determination unit 302*a* outputs a pixel value of the pixel of interest on the RAW image, to the representative value calculation unit 302*c* as a corrected pixel value, without any change.

In step S703, the candidate value calculation unit 302*b* calculates a plurality of candidate values of the correction amount for correcting the RTS noise. Specifically, based on the RTS_Value that corresponds to the pixel of interest (included in the RTS noise information included in the RTS noise output from RTS noise pixel determination unit 302*a*), the candidate value calculation unit 302*b* determines all values possible as the pixel value that is not less than 0 and not greater than RTS_Value (all integers not less than 0 and not greater than RTS_Value in a case where solely integers are possible as RAW image) as candidate values (candidate value calculation method 1). In a case where the amplifier gain value set by the imaging controller 114 to the column amplifier, or the like, of the image sensor 105 differs between the case of RTS noise detection (amplifier gain value=G0) and the case of RTS noise correction (amplifier gain value=G1), the candidate value calculation unit 302*b* may replace the RTS_Value with a value obtained by multiplying the ratio (G=G1/G0) of the amplifier gain value at RTS noise correction to the amplifier gain value at RTS noise detection, by the RTS_Value. Moreover, the candidate value calculation unit 302*b* may include a pre-settable RTS_Value for each of amplifier gain values into the RTS noise information, and may use the RTS_Value according to the amplifier gain value that has been set.

Subsequently, based on the pixel value of the RAW image surrounding the pixel of interest, the representative value calculation unit 302*c* executes representative value calculation processing of calculating a representative value (expected pixel value on the RAW image in a case where RTS noise is not occurring on pixel of interest) (step S704). After step S704, the second image processing apparatus 30 proceeds to step S705 described below.

Figure 14:
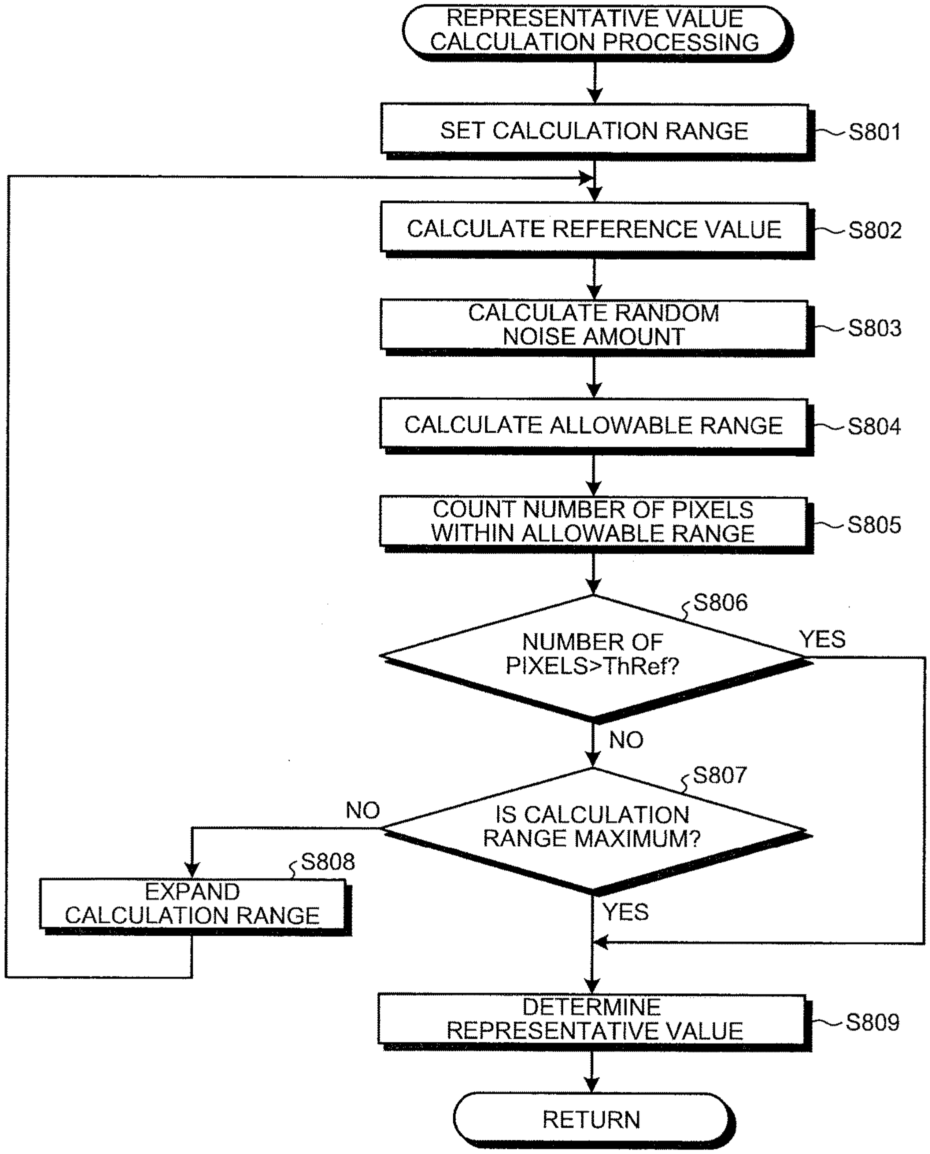
FIG. 14 is a flowchart illustrating an outline of representative value calculation processing in FIG. 13.

FIG. 14 is a flowchart illustrating an outline of representative value calculation processing in step S704 in FIG. 13.

As illustrated in FIG. 14, the representative value calculation unit 302*c* first sets a minimum calculation range as a target for calculating the representative value, based on the pixel of interest (step S801). Specifically, in case of determining a range of maximum of 7×7 as a target range around the pixel of interest, as a calculation range, the representative value calculation unit 302*c* sets a range of 3×3, that is, a minimum range and not exceeding the 7×7 range, as a minimum calculation range.

Subsequently, the representative value calculation unit 302*c* calculates a reference value for calculating a random noise amount that occurs in the neighborhood of the pixel of interest on the RAW image (step S802). Specifically, the representative value calculation unit 302*c* calculates, as a reference value, the pixel value of the pixel of interest on the RAW image (reference value calculation method 1).

Thereafter, the random noise amount estimation unit 302*d* obtains the random noise model recorded in the non-volatile memory 112 via the third external I/F unit 301, the first external I/F unit 115, and the bus 113, and calculates a random noise amount according to the pixel value of the pixel of interest or the reference value in the neighborhood of the pixel of interest on the RAW image (step S803).

Figure 15:
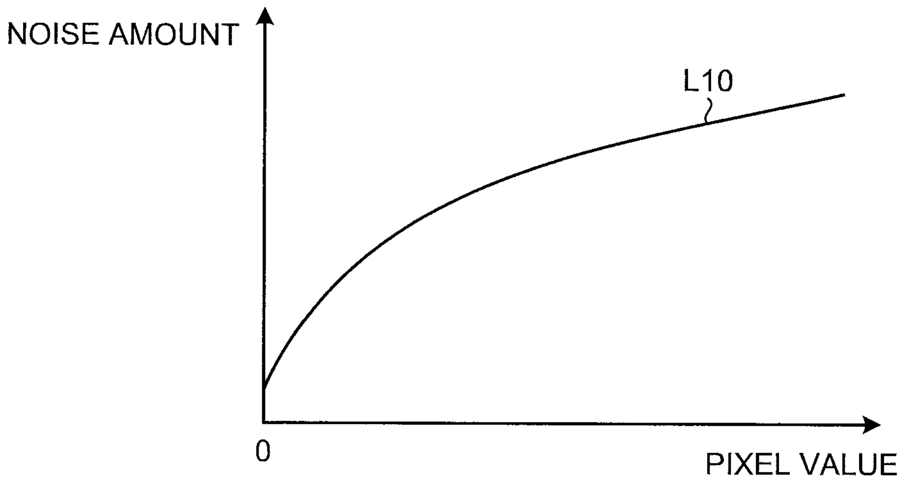
FIG. 15 is a flowchart illustrating an exemplary random noise model.

FIG. 15 is a flowchart illustrating an exemplary random noise model. In FIG. 15, the vertical axis represents the noise amount, and the horizontal axis represents the pixel value. FIG. 15 uses the standard deviation of the pixel value as the random noise amount on the vertical axis, and thus, indicates the random noise model according to characteristic of the image sensor 105.

As illustrated in a curve L10 in FIG. 15, the greater the pixel value, the greater the random noise amount on the image sensor 105. Accordingly, the random noise amount estimation unit 302*d* according to the first embodiment calculates the random noise amount (calculates standard deviation) based on the random noise model of the curve L10 in FIG. 15. It may be possible to use not only the curve illustrated in FIG. 15, but also a characteristic of the random noise model obtained by approximation with an approximate equation or polygonal lines.

Subsequently, based on the pixel value of the RAW image within the calculation range, the representative value calculation unit 302*c* calculates an allowable range (effective range) that is a pixel value range available for calculating the representative value (step S804). Specifically, the representative value calculation unit 302*c* calculates the upper limit of the allowable range (effective range) using the following Formula (4).

$$\text{Reference Value}+\text{Random Noise Amount(standard deviation)}\times R+\text{RTS\_Value} \quad (4)$$

where, R is a predetermined coefficient, which is set in accordance with a level how RTS noise can be visually recognized with respect to the random noise. For example, the coefficient of R is preferably a value around two. Moreover, the representative value calculation unit 302*c* calculates the lower limit of the allowable range using the following Formula (5).

$$\text{Reference Value}-\text{Random Noise Amount(standard deviation)}\times R-\text{RTS\_Value} \quad (5)$$

It may be possible to use a maximum value of a plurality of candidate values instead of the RTS_Value. Moreover, the reference value in Formula (4) and Formula (5) may be obtained by a method different from that used for estimating the random noise amount by the random noise amount estimation unit 302*d* in above-described step S803. In this manner, the representative value calculation unit 302*c* is capable of calculating an allowable range in consideration of the RTS noise of the pixel of interest and the random noise in the neighborhood of the pixel of interest.

Thereafter, the representative value calculation unit 302*c* determines whether each of the pixel values for the pixels other than the pixel of interest on the RAW image within the calculation range (pixel value for a color same as the color of the pixel of interest, in case of the image sensor 105 using a color filter) is within the allowable range calculated in above-described step S804, and counts the number of pixel values within the allowable range (step S805). The count value obtained in step S805 tends to increase in the case of a flat subject, and tends to decrease in the case of the subject that includes an edge. It may be possible to omit counting for the pixel having a possibility that RTS noise is occurring within the calculation range.

Subsequently, in a case where the count value counted in above-described step S805 is greater than a predetermined value ThRef (step S806: Yes), the second image processing apparatus 30 proceeds to step S809 described below. The predetermined value ThRef is preferably one or more, since the representative value calculation unit 302*c* calculates the representative value from the surrounding pixel of the pixel of interest. In contrast, in a case where the count value counted in above-described step S805 is not greater the predetermined value ThRef (step S806: No), the second image processing apparatus 30 proceeds to step S807 described below.

In step S807, in a case where the calculation range as a target for calculating the representative value is maximum (step S807: Yes), the second image processing apparatus 30 proceeds to step S809 described below. In contrast, in a case where the calculation range as a target for calculating the representative value is not maximum (step S807: No), the second image processing apparatus 30 proceeds to step S808 described below.

In step S808, the representative value calculation unit 302*c* expands the calculation range for calculating the representative value (step S808). Specifically, the representative value calculation unit 302*c* expands the calculation range as a target for calculating the representative value by one or more pixels in the horizontal or vertical direction, within a maximum possible range. For example, in a case where a 3×3 range around the pixel of interest is set as the calculation range, the representative value calculation unit 302*c* resets the calculation range to a 5×5 range around the pixel of interest. After step S808, the second image processing apparatus 30 returns to step S802. While the representative value calculation unit 302*c* sets, in step S808, the 3×3 range or the 5×5 range as the calculation range, it is also possible to set, for example, a range of 5×3 or a range of 3×5 as the calculation range by expanding the range solely horizontally or solely vertically.

In step S809, the representative value calculation unit 302*c* calculates the representative value (step S809). Specifically, the representative value calculation unit 302*c* first selects a pixel value included in the allowable range (effective range) (pixel value for a color same as the color of the pixel of interest, in case of the image sensor 105 using a color filter) among pixel values other than the pixel of interest on the RAW image, within the calculation range. Thereafter, in a case where the number of selected pixels is the predetermined value ThRef or above, the representative value calculation unit 302*c* calculates (determines) a median value of the selected pixel values, as a representative value. In a case where the number of selected pixel values is an even number, the representative value calculation unit 302*c* calculates the median value closer to the pixel value of the pixel of interest on the RAW image, as the representative value. In this case, it is possible to avoid over-correction. Moreover, in a case where the number of selected pixels is below the predetermined value ThRef, the representative value calculation unit 302*c* determines, as the representative value, the pixel value of the pixel other than the pixel of interest, on the RAW image, having a pixel value closest to the pixel value of the pixel of interest, on the RAW image, within the calculation range. While the representative value calculation unit 302*c* calculates the representative value using the median value, it is also possible to calculate the representative value using other methods including, for example, an average, an intermediate value of the distribution. Moreover, the representative value calculation unit 302*c* may perform edge direction discernment within the calculation range and may calculate a surrounding pixel value in the direction having the highest correlation, as the representative value, based on a result of the edge direction discernment. Furthermore, the representative value calculation unit 302*c* may exclude a pixel having a possibility that RTS noise is occurring, among the pixels other than the pixel of interest within the calculation range. At this time, in a case where there is no pixel having a possibility that RTS noise is occurring within the calculation range at the point of execution of step S809, the representative value calculation unit 302*c* determines the pixel value of the pixel of interest as the representative value. After step S809, the second image processing apparatus 30 returns to the main routine in FIG. 13.

In this manner, the representative value calculation unit 302*c* calculates a representative value preferentially in the neighborhood of the pixel of interest in the above-described representative value calculation processing. Furthermore, in order to avoid variation of the representative value by edge, or the like, the representative value calculation unit 302*c* calculates the representative value by limiting the range of the surrounding pixels of the pixel of interest based on the random noise amount estimated by the random noise amount estimation unit 302*d*. Furthermore, it is also possible to calculate the representative value by excluding a neighboring pixel having a possibility that RTS noise is occurring.

Returning to FIG. 13, description of step S705 and subsequent steps follows below.

In step S705, the correction value calculation unit 302*e* executes correction value calculation processing of calculating a pixel value of the RAW image on which the RTS noise on the pixel of interest has been corrected, based on the plurality of candidate values calculated in above-described step S703 by the candidate value calculation unit 302*b*, and based on the representative value calculated in above-described step S704 by the representative value calculation unit 302*c*. After step S705, the second image processing apparatus 30 proceeds to step S706 described below.

Figure 16:
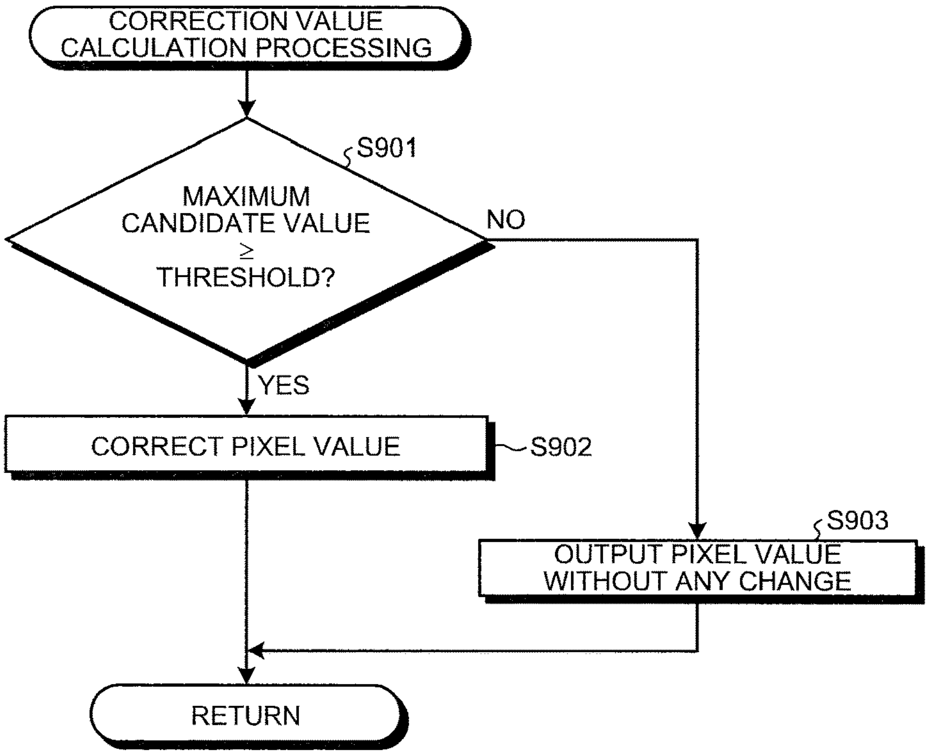
FIG. 16 is a flowchart illustrating an outline of correction value calculation processing in FIG. 13.

FIG. 16 is a flowchart illustrating an outline of correction value calculation processing in step S705 in FIG. 13.

As illustrated in FIG. 16, the correction value calculation unit 302*e* first determines whether the maximum value of the candidate value is a threshold or above (step S901) based on the random noise amount (standard deviation in first embodiment) estimated in above-described step S803 in FIG. 14 by the random noise amount estimation unit 302*d*, and based on the maximum value of the candidate value calculated in above-described step S703 in FIG. 13 by the candidate value calculation unit 302*b*. Herein, the threshold is set by following Formula (6).

$$\text{Random Noise Amount}\times Rm \tag{6}$$

where, Rm is a predetermined coefficient. Rm is determined in accordance with a level how RTS noise can be visually seen with respect to the random noise, and the value for Rm is preferably around two. In a case where the correction value calculation unit 302*e* determines that the maximum value of the candidate value is the threshold or above (step S901: Yes), the second image processing apparatus 30 proceeds to step S902 described below. In contrast, in a case where the correction value calculation unit 302*e* determines that the maximum value of the candidate value is not the threshold or above (step S901: No), the second image processing apparatus 30 proceeds to step S903 described below. The correction value calculation unit 302*e* may compare the RTS_Value of the pixel of interest with the threshold using the RTS_Value of the pixel of interest instead of the maximum value of the candidate value.

In step S902, the correction value calculation unit 302*e* corrects the pixel value. Specifically, the correction value calculation unit 302*e* calculates Δ using the following Formula (7).

$$\Delta=\text{Pixel Value of Pixel of Interest on RAW Image}-\text{Representative Value} \tag{7}$$

Next, the correction value calculation unit 302*e* compares an absolute value of Δ with one or more candidate values calculated in above-described step S703 in FIG. 13 by the candidate value calculation unit 302*b*, and selects a candidate value closest to the absolute value of Δ, as δ. Since the correction value calculation unit 302*e* has a plurality of candidate values being closet to the absolute value of Δ, the smallest candidate value of the plurality of candidate values is to be selected as δ so as to avoid over-correction.

Finally, using the following Formulas (8) and (9), the correction value calculation unit 302*e* corrects the pixel value of the pixel of interest on the RAW image by allowing the value by δ to shift in the representative value direction, and outputs the corrected pixel value of the pixel of interest, to the image processing unit 303.

In case of Δ<0, $$\text{Pixel Value of Pixel of Interest on RAW Image}+\delta \tag{8}$$

In case of Δ≥0, $$\text{Pixel Value of Pixel of Interest on RAW Image}-\delta \tag{9}$$

After step S902, the second image processing apparatus 30 returns to the main routine in FIG. 15. While the correction value calculation unit 302*e* calculates Δ and selects the smallest candidate value from among the plurality of candidate values in step S902, it is also possible to calculate a value by individually adding or subtracting each of the plurality of candidate values onto the pixel value of the pixel of interest on the RAW image, and to select a closest representative value among the plurality of values after addition or subtraction, obtained after the calculation. Moreover, in a case where the correction value calculation unit 302*e* can obtain the same result in step S902, another calculation method or comparison method may be employed. Still further, processing executed by the correction value calculation unit 302*e* is equivalent to processing of determining a representative value clipped onto a range not less than the pixel value of the pixel of interest on the RAW image −RTS_Value and not greater than the pixel value of the pixel of interest on the RAW image+RTS_Value, as the corrected pixel value of the pixel of interest.

In step S903, the correction value calculation unit 302*e* outputs the pixel value of the pixel of interest on the RAW image, to the image processing unit 303, without any change. After step S903, the second image processing apparatus 30 returns to the main routine in FIG. 15.

Returning to FIG. 13, description of step S706 and subsequent steps follows below.

In step S706, the RTS noise correction unit 302 determines whether processing in above-described steps S701 to S705 is finished for all the pixels (step S706). In a case where the RTS noise correction unit 302 determines that the above-described processing is finished for all the pixels (step S706: Yes), the second image processing apparatus 30 finishes the current processing. In contrast, in a case where the RTS noise correction unit 302 determines that the above-described processing is not finished for all the pixels (step S706: No), the second image processing apparatus 30 returns to above-described step S701.

According to the above-described first embodiment of the present invention, the pixel value group creation unit 202*b* creates the plurality of pixel value groups using classification into each of the read-out circuits (amplifier units 105*e*), making it possible to detect RTS noise with high accuracy without increasing the number of dark-time RAW images. As a result, it is possible to reduce the time to shoot dark-time RAW image for detection, the time to read the dark-time RAW image at detection, or the like, and it is possible to detect, with high accuracy, the blinking defect noise with a pixel value varying within a fixed range, such as the RTS noise, while reducing the time needed for detecting the RTS noise.

Moreover, according to the first embodiment of the present invention, the RTS noise feature data calculation unit 202*d* uses, in detection of RTS noise, a histogram in which individual values in the pixel value group are converted into absolute values. This can enhance accuracy of distribution and reduce the range of distribution to a half, and thus, can reduce the calculation amount in error calculation by fitting, to about a half of the case where the absolute value is not used. Accordingly, it is possible to detect, with high speed and high accuracy, the noise with a pixel value varying within a fixed range, such as the RTS noise.

Furthermore, according to the first embodiment of the present invention, since the pixel value group creation unit 202*b* excludes the isolated points and pixels detected by the isolated point detection unit 202*a* in detection of RTS noise, it is possible to avoid false detection of RTS noise due to occurrence of the isolated point. Accordingly, it is possible to detect, with high accuracy, the noise with a pixel value varying within a fixed range, such as the RTS noise.

Still further, according to the first embodiment of the present invention, whether there is a possibility that RTS noise is occurring is determined by using the noise level of the pixel value group in RTS noise detection. Accordingly, it is possible to reduce the calculation amount since there is no need to calculate RTS noise feature data by fitting, or the like for all the pixel value groups.

Moreover, according to the first embodiment of the present invention, the correction value calculation unit 302*e* uses a plurality of candidate values calculated by the candidate value calculation unit 302*b* in the RTS noise correction, whereby it is possible to appropriately correct the noise with a pixel value varying within a fixed range, such as the RTS noise, while avoiding over-correction in the case of occurrence of the RTS noise below RTS_Value.

Furthermore, according to the first embodiment of the present invention, the correction value calculation unit 302*e* calculates a representative value from appropriate surrounding pixels based on the random noise amount estimated by the random noise amount estimation unit 302*d*, in the RTS noise correction, it is possible to minimize effects of edge even when the pixel of interest is in the neighborhood of the edge portion and appropriately correct the noise with a pixel value varying within a fixed range, such as the RTS noise.

Furthermore, according to the first embodiment of the present invention, in a case where the RTS noise is unnoticeably hidden by the random noise in RTS noise correction, the correction value calculation unit 302*e* does not perform processing of correcting the RTS noise. Accordingly, it is possible to appropriately correct the noise with a pixel value varying within a fixed range, such as the RTS noise, while avoiding over-correction.

First Modification of First Embodiment

Figure 17:
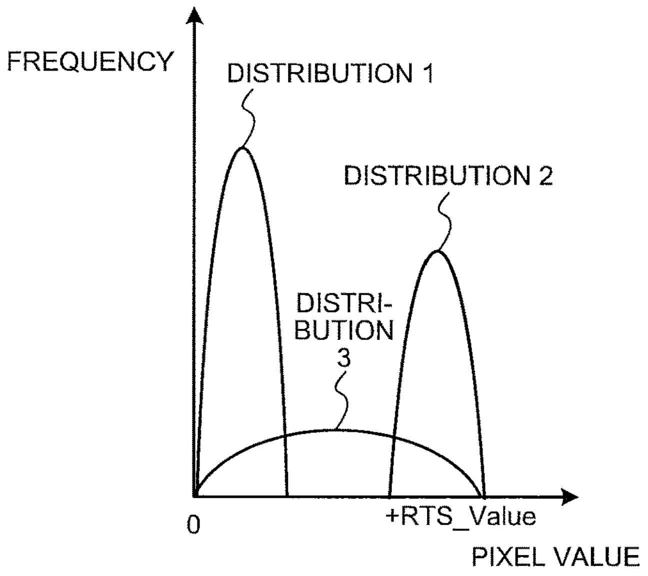
FIG. 17 is a diagram illustrating exemplary mixed normal distribution approximation of an absolute value histogram.

The RTS noise feature data calculation unit 202*d* according to First Modification of the first embodiment of the present invention is capable of calculating the RTS_Value with another calculation method. Specifically, it may be possible to consider the absolute value histogram (blinking defect noise model) in above-described FIG. 11 to be a mixed normal distribution including three normal distributions having different characteristics as illustrated in FIG. 17, and obtain a median value and standard deviation of each of the normal distributions such that the difference between the absolute value histogram and the mixed normal distribution becomes minimum and obtain the proportion of three distributions so as to calculate the median value of distribution 2 as RTS_Value. In this case, the RTS noise feature data calculation unit 202*d* can decrease the calculation amount using a known EM algorithm, or the like.

Second Modification of First Embodiment

The candidate value calculation unit 302*b* according to Second Modification of the first embodiment of the present invention calculates a plurality of candidate values of the correction amount for correcting the RTS noise (step S703 in FIG. 13 described above) using another candidate value calculation method (candidate value calculation method 2).

Candidate Value Calculation Method 2

The candidate value calculation unit 302*b* calculates a value extracted at a predetermined interval from values not less than 0 and not greater than RTS_Value, as a candidate value, based on RTS_Value that corresponds to the pixel of interest. For example, an average standard deviation×r×n (n is integer not less than 0) that is not greater than RTS_Value is calculated as the candidate value using an average standard deviation as a value based on the average random noise amount. Note that r is determined in accordance with a level how RTS noise can be visually seen with the respect to the random noise. Preferably, r is a value around two.

Moreover, the candidate value calculation unit 302*b* may calculate a maximum value of RTS_Value/(Max−1)×n (n is integer not less than 0 and not greater than Max−1) that is not greater than RTS_Value, as the candidate value, based on the maximum value of the RTS_Value and a maximum number Max of the candidate value determined from hardware restrictions (restrictions including memory and circuit scale).

Figure 18:
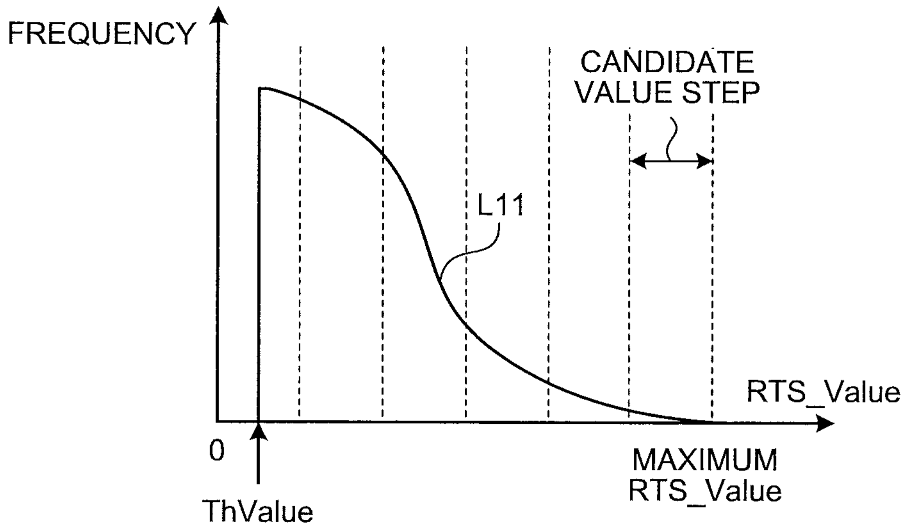
FIG. 18 is a diagram illustrating a relationship between RTS_Value luminance distribution and a candidate value, in Candidate Value Calculation Method 2 according to Second Modification of the first embodiment of the present invention.

FIG. 18 is a diagram illustrating a relationship between RTS_Value histogram in the candidate value calculation method 2 and a candidate value. As illustrated in FIG. 18, a thick line L11 represents an exemplary histogram of the RTS_Value. In a case where the maximum number Max is seven, the value represented by a dotted line is a possible candidate value, and an actual candidate value is a value not greater than RTS_Value corresponding to the pixel of interest, represented by a dotted line.

According to above-described Second Modification of the first embodiment, the candidate value calculation unit 302*b* calculates a plurality of candidate values of the correction amount for correcting the RTS noise in consideration of hardware restriction. This enables effective correction on the RTS noise occurred in the image sensor 105.

Third Modification of First Embodiment

The candidate value calculation unit 302*b* according to Third Modification of the first embodiment of the present invention calculates a plurality of candidate values of the correction amount for correcting the RTS noise (step S703 in FIG. 13 described above) using another candidate value calculation method (candidate value calculation method 3).

Candidate Value Calculation Method 3

The candidate value calculation unit 302*b* divides RTS_Value histogram frequency equally in accordance with the maximum number Max of the candidate values determined by hardware restriction, and calculates the value not greater than RTS_Value corresponding to the pixel of interest, as the candidate value.

Figure 19:
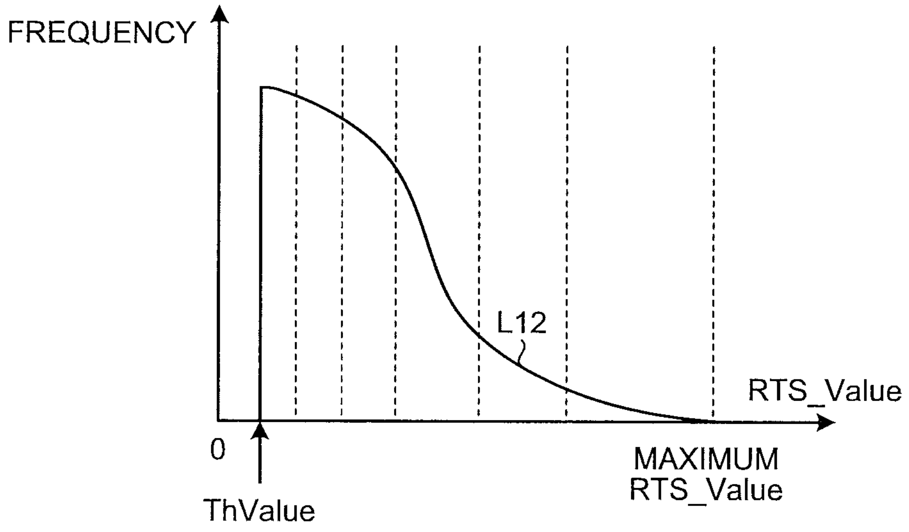
FIG. 19 is a diagram illustrating a relationship between RTS_Value histogram and a candidate value, in Candidate Value Calculation Method 3 according to Third Modification of the first embodiment of the present invention.

FIG. 19 is a diagram illustrating a relationship between RTS_Value histogram in the candidate value calculation method 3 and a candidate value. As illustrated in FIG. 19, a thick line L12 represents an exemplary histogram of the RTS_Value. The value represented by the dotted line indicates a possible candidate value, being the position that equally divides the RTS_Value histogram frequency. The actual candidate value is a value not greater than RTS_Value corresponding to the pixel of interest, represented by a dotted line.

In this manner, according to Third Modification of the first embodiment, the candidate value calculation unit 302*b* calculates a candidate value of the correction amount for correcting the RTS in view of the distribution of the RTS noise, taking hardware restriction in consideration. This enables effective and highly accurate correction to be performed on all RTS noise occurred in the image sensor 105.

Fourth Modification of First Embodiment

The candidate value calculation unit 302*b* according to Fourth Modification of the first embodiment of the present invention calculates a plurality of candidate values of the correction amount for correcting the RTS noise (step S703 in FIG. 13 described above) using another candidate value calculation method (candidate value calculation method 4).

Candidate Value Calculation Method 4

The candidate value calculation unit 302*b* calculates a value extracted at a predetermined interval from values that are not less than 0 and not greater than RTS_Value, as a candidate value, based on RTS_Value that corresponds to the pixel of interest. The difference from the candidate value calculation methods 2 and 3 is that the predetermined interval is changed in accordance with the pixel value. Specifically, the candidate value calculation unit 302*b* calculates a candidate value corresponding to the pixel of interest based on the random noise amount (standard deviation in Fourth Modification of first embodiment) according to a pixel value of the pixel of interest or a pixel value on the RAW image in the neighborhood of the pixel of interest, calculated by the random noise amount estimation unit 302*d*. More specifically, the candidate value calculation unit 302*b* obtains the random noise calculated by the random noise amount estimation unit 302*d* based on the average of the pixel value of the pixel of interest on the RAW image and the pixel value on the RAW image neighboring (surrounding) the pixel of interest (pixel value for a color same as the color of the pixel of interest, in case of the image sensor 105 using a color filter), or the like, and then, using the random noise amount, the candidate value calculation unit 302*b* calculates standard deviation×r×n (n is integer not less than 0 and not greater than Max−1), within a range of the RTS_Value of below, as a candidate value.

According to above-described Fourth Modification of the first embodiment, the candidate value calculation unit 302*b* calculates the candidate value corresponding to the pixel of interest based on the random noise amount according to the pixel value of the pixel of interest or the pixel value on the RAW image in the neighborhood of the pixel of interest, calculated by the random noise amount estimation unit 302*d*. Performing correction with fine accuracy, for a case possibly unnoticeably hidden by the random noise, would increase the calculation amount without achieving effects of correction that meets the increase in the calculation amount. Using the technique in Fourth Modification of the first embodiment, however, it is possible to sufficiently correct the RTS noise of a level having strangeness that is not hidden by the random noise, with a minimum possible number of candidate values.

Fifth Modification of First Embodiment

The representative value calculation unit 302*c* according to Fifth Modification of the first embodiment of the present invention calculates a reference value (above-described step S802 in FIG. 14) for calculating the random noise amount that occurs in the neighborhood of the pixel of interest on the RAW image, using another reference value calculation method (reference value calculation method 2).

Reference Value Calculation Method 2

The representative value calculation unit 302*c* calculates any of a maximum value, an average, and a median value, of the pixel values on the RAW image within a calculation range (pixel value for a color same as the color of the pixel of interest, in case of the image sensor 105 using a color filter), as the reference value.

According to the above-described Fifth Modification of the first embodiment, in a case where the pixel value on the RAW image is smaller than the original pixel value due to RTS noise, the representative value calculation unit 302*c* calculates a reference value using a pixel value surrounding the pixel of interest. Accordingly, it is possible to prevent the random noise amount calculated by the random noise amount estimation unit 302*d* from being calculated as a value smaller than the actual value.

Sixth Modification of First Embodiment

The representative value calculation unit 302*c* according to Sixth Modification of the first embodiment of the present invention calculates a reference value (above-described step S802 in FIG. 14) for calculating the random noise amount that occurs in the neighborhood of the pixel of interest on the RAW image, using another reference value calculation method (reference value calculation method 3).

Reference Value Calculation Method 3

The representative value calculation unit 302*c* calculates, within a calculation range, any of a maximum value, an average, and a median value, of the pixel values, on the RAW image, of the pixel determined to include no occurrence of RTS noise by the RTS noise pixel determination unit 302*a* (pixel value for a color same as the color of the pixel of interest, in case of the image sensor 105 using a color filter), as the reference value. In a case where the RTS noise pixel determination unit 302*a* determines that RTS noise is occurring on all the pixels within a calculation range, the representative value calculation unit 302*c* performs calculation using the above-described reference value calculation method 1 or reference value calculation method 2.

According to the above-described Sixth Modification of the first embodiment of the present invention, in a case where the pixel value on the RAW image is smaller than the original pixel value due to RTS noise, the representative value calculation unit 302*c* calculates a reference value using a pixel value surrounding the pixel of interest. Accordingly, it is possible to prevent the random noise amount calculated by the random noise amount estimation unit 302*d* from being calculated as a value smaller than the actual value.

Seventh Modification of First Embodiment

The representative value calculation unit 302*c* according to Seventh Modification of the first embodiment of the present invention calculates a reference value for calculating the random noise amount that occurs in the neighborhood of the pixel of interest on the RAW image, using another reference value calculation method (reference value calculation method 4).

Representative Value Calculation Method 4

The representative value calculation unit 302*c* calculates the random noise amount using the representative value by the random noise amount estimation unit 302*d*, and determines a threshold in above-described step S901 using the random noise amount based on the representative value instead of the reference value.

According to Seventh Modification of the first embodiment of the present invention, it is possible to prevent the threshold from being calculated as a smaller or larger value than the actual value in a case where RTS noise is occurring on the pixel of interest.

Eighth Modification of First Embodiment

In the first embodiment the present invention, the average random noise amount calculation unit 202*c* calculates the random noise amount of each of the plurality of pixel value groups and calculates the average of the average random noise amounts of all the pixel value groups for which the RTS flag is set to the clear state. Alternatively, the average random noise amount calculation unit 202*c* may calculate a random noise amount of each of the plurality of pixel value groups, and may calculate the random noise amount of the pixel that corresponds to the pixel value group for which the RTS flag is set to a clear state on a plurality of dark-time RAW images, as the random noise amount of the plurality of dark-time RAW images. In this case, the RTS noise determination unit 202*e* may determine whether RTS noise occurs on each of the plurality of pixel value groups based on the random noise amount of each of the plurality of pixel value groups calculated by the average random noise amount calculation unit 202*c*, the random noise amount of the plurality of dark-time RAW images calculated by the average random noise amount calculation unit 202*c*, and the feature data calculated by the RTS noise feature data calculation unit 202*d*. This enables calculation of the random noise amount of the plurality of dark-time RAW images with higher accuracy. As a result, it is possible to determine with higher accuracy whether it is a pixel value group having a possibility of occurrence of the RTS noise.

Second Embodiment

Next, a second embodiment of the present invention will be described. In the first embodiment, the RTS_Value is recorded when detecting the RTS noise, and a plurality of candidate values of the correction amount is calculated based on the recorded RTS_Value. In contrast, the second embodiment first calculates all possible numbers to be the candidate value of the correction amount shared by the whole image in use, as a result of RTS noise detection. Next, correction is performed on a sharing pixel block on which RTS noise occurs, using from a smallest value as a candidate value of the correction amount among all the numbers possible as the candidate value of the correction amount, while the number of the candidate values of the correction amount is recorded. Specifically, the difference from the above-described first embodiment is in processing of step S609 in RTS noise determination processing in FIG. 12 and processing of step S703 in FIG. 13. Accordingly, hereinafter, processing in steps S609 and S703 according to the second embodiment will be described. The same reference signs are used to designate the same elements as those in the first embodiment, and explanation thereof will be omitted.

Figure 20:
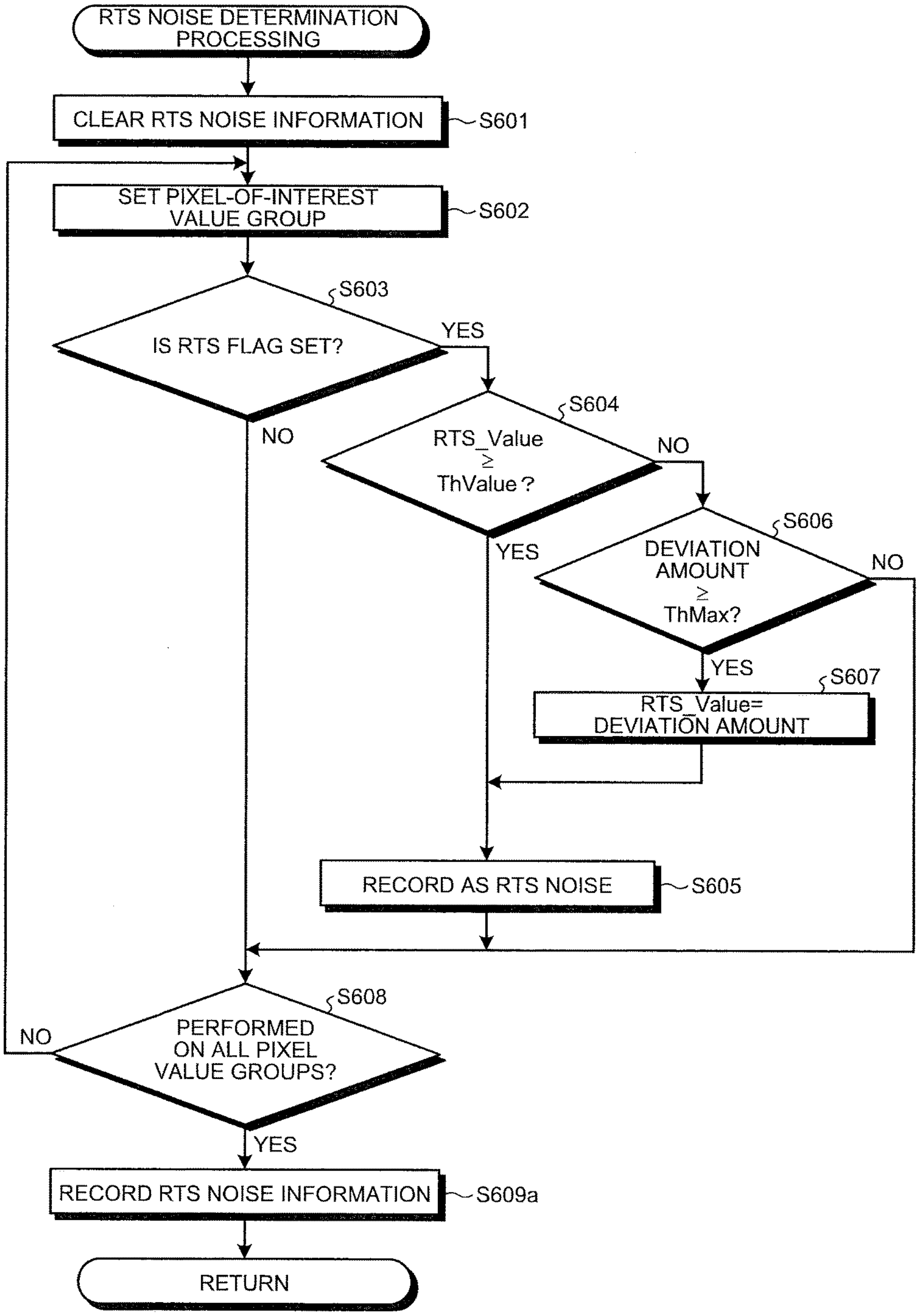
FIG. 20 is a flowchart illustrating an outline of RTS noise determination processing executed by a first image processing apparatus according to a second embodiment of the present invention.

FIG. 20 is a flowchart illustrating outline of RTS noise determination processing executed by the first image processing apparatus 20 according to the second embodiment. In FIG. 20, the first image processing apparatus 20 performs processing of step S609*a* instead of the processing of S609 according to the above-described first embodiment.

In step S609*a*, the RTS noise determination unit 202*e* first calculates a maximum value of the RTS_Value temporarily stored in the volatile memory 111 in above-described step S605.

Thereafter, the RTS noise determination unit 202*e* calculates Cn (n is integer not less than zero and less than Max) using the following Formula (10), based on the maximum number Max of the candidate value.

$$Cn = \text{Maximum Value of RTS\_Value}/(\text{Max}-1)\times n \tag{10}$$

where n is integer not less than 0 and less than Max. In above-described FIG. 18, Cn calculated by Formula (10) corresponds to the position of the dotted line.

Subsequently, the RTS noise determination unit 202*e* counts the number of Cn that is not greater than RTS_Value, based on the RTS_Value temporarily stored in the volatile memory 111 in association with the position of the sharing pixel block. In this case, since C0 (=0) is always included, the RTS noise determination unit 202*e* may exclude this from the count value. Moreover, the RTS noise determination unit 202*e* may count the number up to the minimum Cn exceeding the RTS_Value.

Finally, the RTS noise determination unit 202*e* records RTS noise information into the RTS noise information recording unit 112*b*. The RTS noise information associates the number of maximum numbers Max, individual Cn, positional information of the sharing pixel blocks, and the count value (number of candidate values of the RTS noise correction value) with each other. Other than the above-described values, the RTS noise determination unit 202*e* may use a value indicated in dotted line in the above-described FIG. 19, as Cn. In this case, Cn is a value obtained by equally dividing the frequency of the histogram of RTS_Value, by maximum value Max−1.

Figure 21:
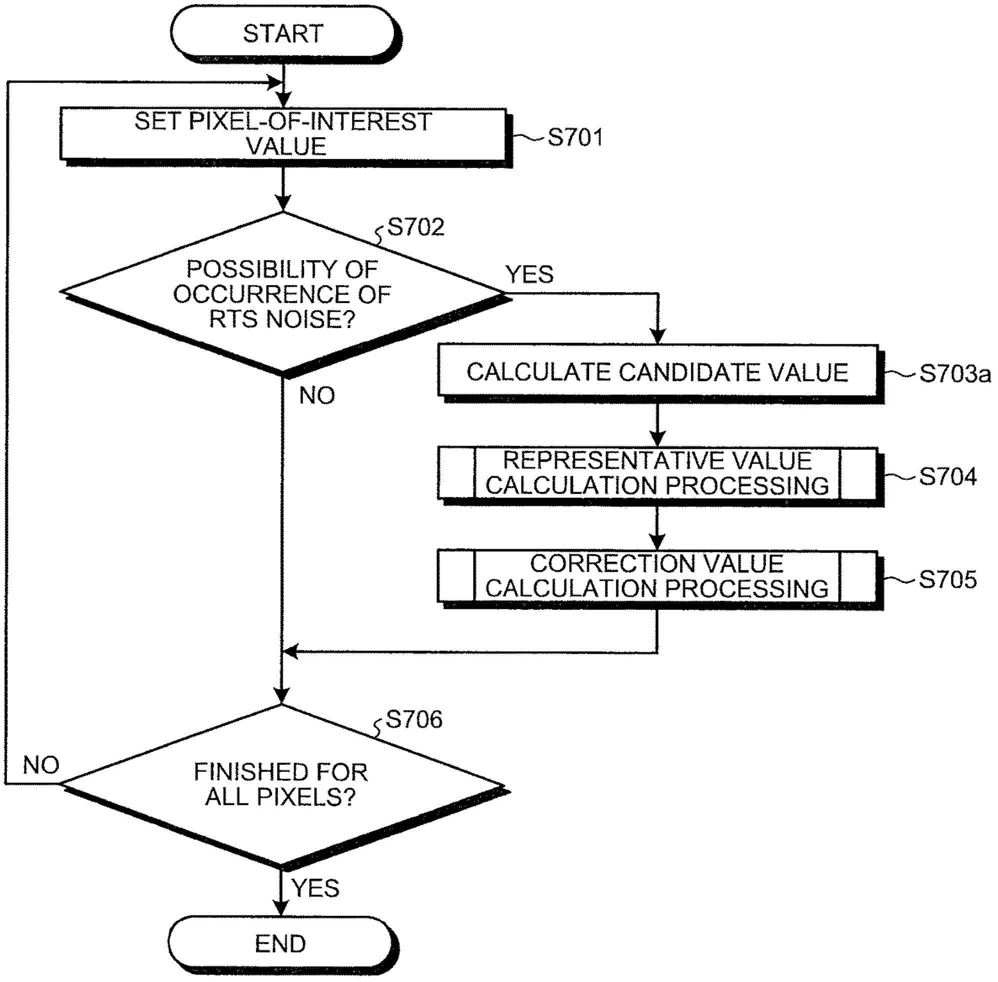
FIG. 21 is a flowchart illustrating an outline of processing executed by the second image processing apparatus according to a second embodiment of the present invention.

FIG. 21 is a flowchart illustrating an outline of processing executed by the second image processing apparatus 30 according to the second embodiment. In FIG. 21, the second image processing apparatus 30 performs processing of step S703*a* instead of the processing of S703 according to the above-described first embodiment.

In step S703*a*, the candidate value calculation unit 302*b* obtains the number of maximum number Max and Cn recorded in the non-volatile memory 112, and determines the number of candidate values corresponding to the pixel of interest from smaller Cn, as the candidate value of the correction amount. In a case where the amplifier gain value set by the imaging controller 114 to the amplifier gain value set to the column amplifier, or the like, of the image sensor 105 differs between the time of RTS noise detection (amplifier gain value=G0) and the time of RTS noise correction (amplifier gain value=G1), the candidate value calculation unit 302*b* may replace the candidate value of the correction amount with a value obtained by multiplying the ratio (G=G1/G0) of the amplifier gain value at RTS noise correction to the amplifier gain value at RTS noise detection, by the candidate value of the correction amount. Moreover, the candidate value calculation unit 302*b* may record beforehand the candidate value of the correction amount for each of the amplifier gain values, in the non-volatile memory 112, and may use the candidate value of the correction amount according to the set amplifier gain value. Moreover, in a case where zero is not included in the number of candidate values, the candidate value calculation unit 302*b* determines the number of candidate values of C0 and smaller value from C1 or above, as the candidate value of the correction amount. Still further, the above-described first embodiment includes processing that uses RTS_Value. In the second embodiment, however, the RTS_Value is not recorded in the non-volatile memory 112, and thus, by using the maximum candidate value calculated in step S703*a* as the RTS_Value in the later processing, it is possible to achieve an effect similar to the effects of the above-described first embodiment.

According to the above-described second embodiment of the present invention, in RTS noise detection, possible values (Cn) for the candidate value of the correction amount in the RTS noise correction are calculated beforehand based on the distribution of the RTS_Value, in RTS noise detection, and the sharing pixel block in which RTS noise occurs and the number of candidate values to be used in RTS noise correction are associated with each other based on RTS_Value, and recorded. The RTS noise occurs due to a defect in the image sensor 105, and thus, individual differences lead to difference in the RTS noise characteristics. In a case where the RTS_Value is directly recorded as in the above-described first embodiment, there is a need to ensure an area (maximum bit number of RTS_Value) for recording possible assumable maximum value of RTS_Value, obtained in consideration of individual difference. In contrast, according to the second embodiment, it is sufficient to record the value up to the maximum number Max. According, it is possible to perform detection that leads to appropriate correction even in a case where unexpected RTS noise occurs. In a case where unexpected RTS noise occurs, it is only required to change Cn alone.

Moreover, according to the second embodiment of the present invention, it is only required, in RTS noise correction, to perform selection from Cn by the number of candidate values, using previously calculated Cn and using the candidate value that is a value based on RTS_Value associated with the sharing pixel block. Accordingly, it is possible to perform correction with simple processing, that is, small calculation amount.

While in the second embodiment of the present invention, the candidate value calculation unit 302*b* calculates Cn based on RTS noise detection results, it is also possible to calculate (determine) Cn beforehand based on a characteristic (for example, average RTS_Value histogram) of the RTS noise that might occur on the image sensor 105 in a case where there is a small individual difference in the characteristic (RTS_Value histogram, in particular) of the RTS noise. As a result, there is no need to calculate Cn for each of the individuals (each of the image sensors 105), and thus, can reduce the calculation amount in RTS noise detection.

Third Embodiment

Next, a third embodiment of the present invention will be described. The RTS noise detection unit 202 and the RTS noise correction unit 302 are separately provided in the above-described first embodiment. In the third embodiment, however, the RTS noise detection unit 202 and the RTS noise correction unit 302 are provided on an imaging apparatus main body. Therefore, the same reference signs are used to designate the same elements as those of the imaging system 1 according to the first embodiment, and explanation thereof will be omitted.

Configuration of Imaging System

Figure 22:
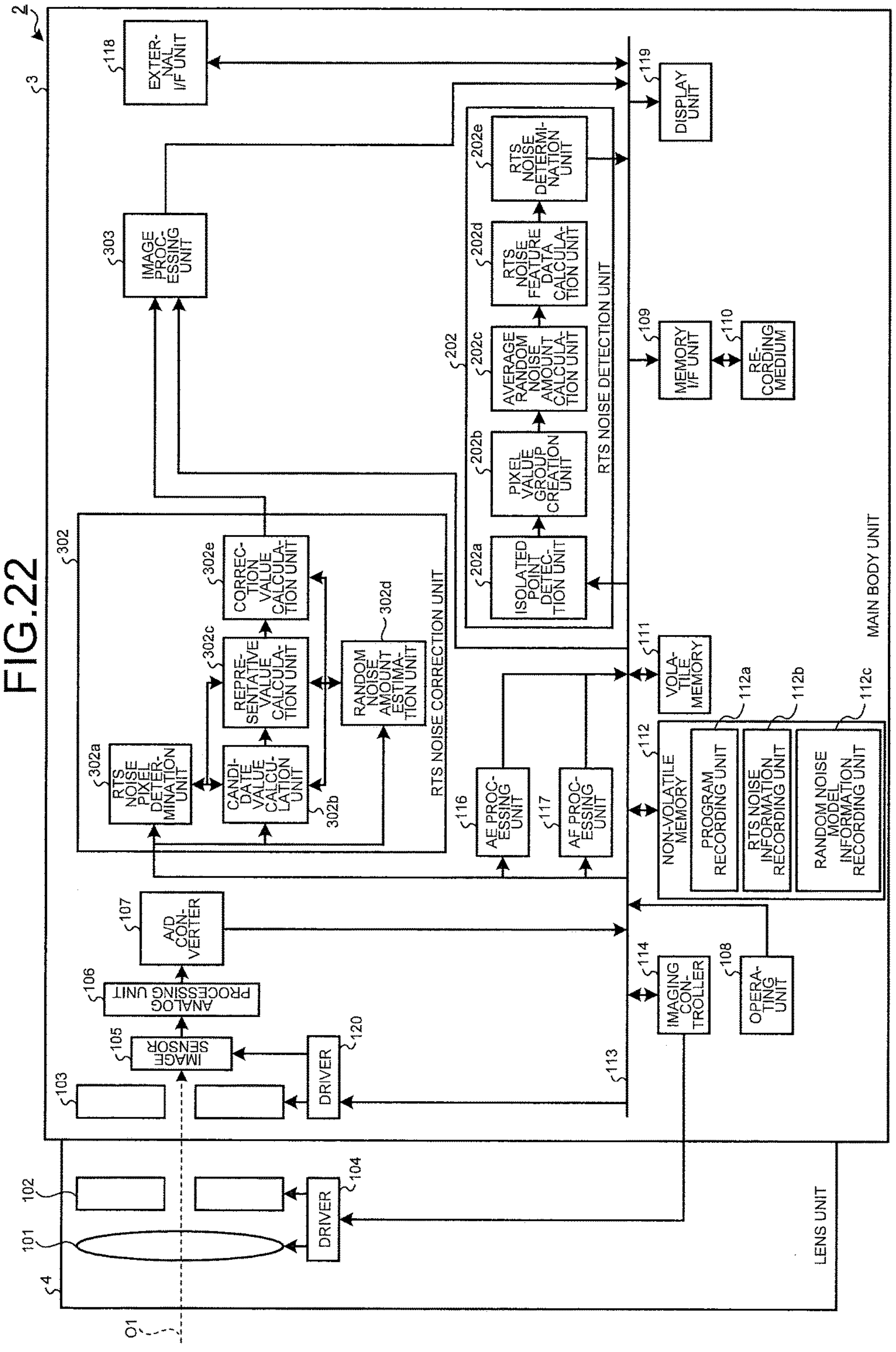
FIG. 22 is a block diagram schematically illustrating a configuration of an imaging system according to a third embodiment of the present invention.

FIG. 22 is a block diagram schematically illustrating a configuration of an imaging system 2 according to a third embodiment of the present invention. The imaging system 2 illustrated in FIG. 22 includes a main body unit 3, a lens unit 4 that can be connected removably with the main body unit 3.

Configuration of Main Body Unit

The main body unit 3 includes the shutter 103, the image sensor 105, the analog processing unit 106, the A/D converter 107, the operating unit 108, the memory I/F unit 109, the recording medium 110, the volatile memory 111, the non-volatile memory 112, the bus 113, the imaging controller 114, an AE processing unit 116, an AF processing unit 117, an external I/F unit 118, a display unit 119, a driver 120, the RTS noise detection unit 202, and the RTS noise correction unit 302. The driver 120 drives the shutter 103 under the control of the imaging controller 114.

The AE processing unit 116 obtains image data stored in the volatile memory 111 via the bus 113, and sets exposure conditions at the time of performing still image shooting or moving image shooting based on the obtained image data. Specifically, the AE processing unit 116 calculates luminance from the image data and determines a diaphragm value, exposure time, ISO sensitivity, or the like, based on the calculated luminance, thereby performing automatic exposure (Auto Exposure) for the imaging system 2.

The AF processing unit 117 obtains the image data stored in the volatile memory 111 via the bus 113, and performs automatic focus adjustment of the imaging system 2 based on the obtained image data. For example, the AF processing unit 117 extracts a high-frequency component signal from the image data, and performs auto-focus (AF) calculation processing onto the high-frequency component signal, thereby determining focusing evaluation of the imaging system 2, thereby performing automatic focus adjustment of the imaging system 2. A method for performing automatic focus adjustment of the imaging system 2 may be a method of obtaining a phase difference signal on the image sensor 105.

The external I/F unit 118 is capable of performing data read/write on various blocks of the main body unit 3 and control using dedicated commands, or the like. The external I/F unit 118 is an interface capable of controlling various blocks on the main body unit 3 by connecting a dedicated circuit that includes FPGA, DSP, GPU, or the like, and an external device such as a personal computer (PC).

The display unit 119 includes a display panel formed with liquid crystal, organic electroluminescence (EL), or the like. The display unit 119 displays an image that corresponds to the image data generated by the image sensor 105.

Configuration of Lens Unit

As illustrated in FIG. 22, the lens unit 4 includes the optical system 101, the diaphragm 102, and the driver 104. The optical system 101 focuses a subject image collected from a predetermined view-field area, onto the image sensor 105.

Processing on Imaging System

Figure 23:
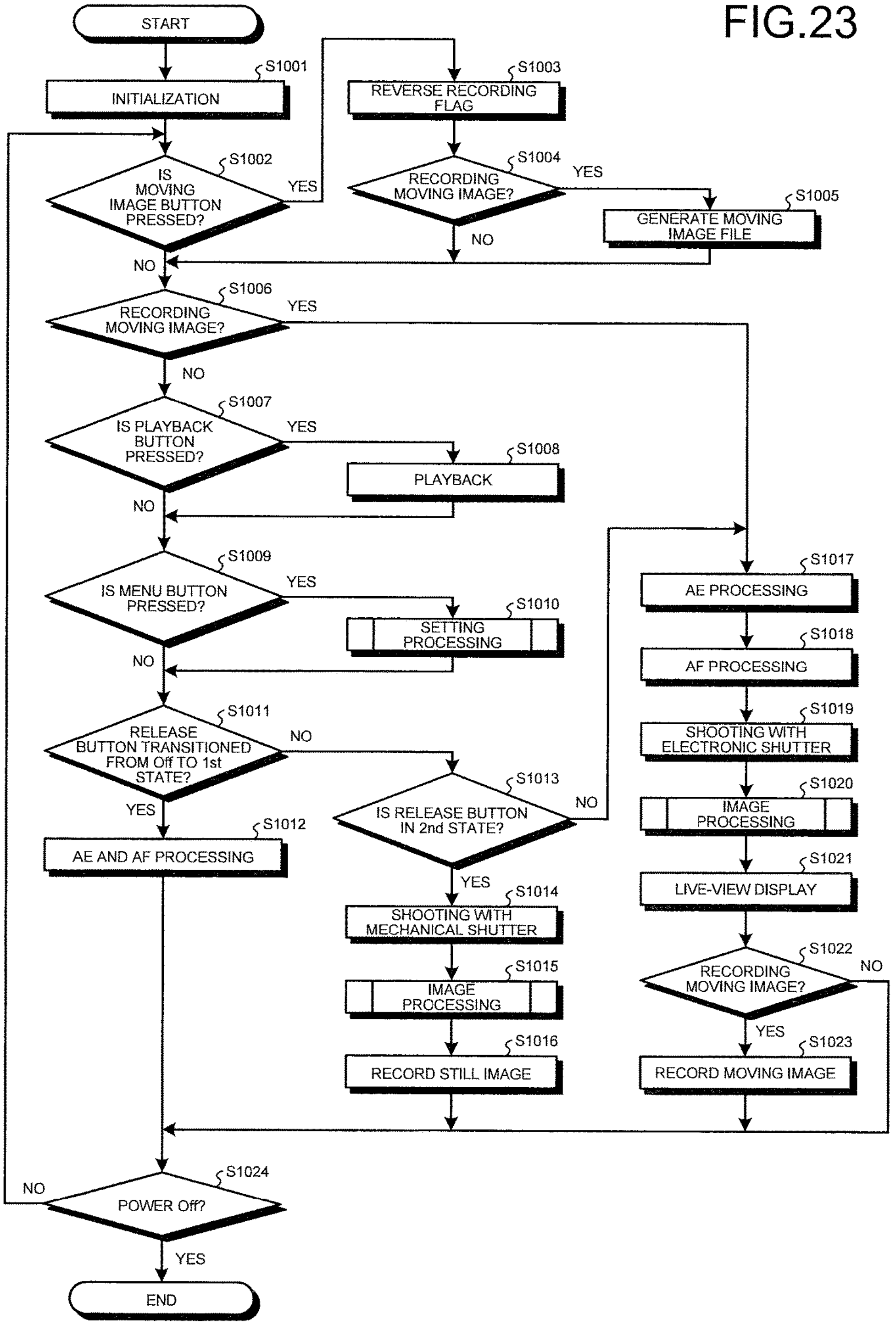
FIG. 23 is a flowchart illustrating an outline of processing executed by the imaging system according to the third embodiment of the present invention.

Next, processing executed by the imaging system 2 will be described. FIG. 23 is a flowchart illustrating outline of processing executed by the imaging system 2.

As illustrated in FIG. 23, a power button (not illustrated) of the operating unit 108 is first operated and then the power supply of the main body unit 3 is turned on, thereafter, the imaging controller 114 initializes the imaging system 2 (step S1001). Specifically, the imaging controller 114 executes initialization of turning the recording flag indicating recording of the moving image, to the off-state. This recording flag is a flag that turns into an on-state during moving image shooting and into an off-state when no moving image is not being shot, being stored in the volatile memory 111.

Subsequently, in a case where the moving image button on the operating unit 108 is pressed (step S1002: Yes), the imaging controller 114 reverses the recording flag indicating that a moving image is being recorded in the on-state (step S1003), and the imaging controller 114 judges whether the imaging system 2 is in the middle of recording a moving image (step S1004). Specifically, the imaging controller 114 determines whether the recording flag stored in the volatile memory 111 is in the on-state. In a case where the imaging controller 114 judges that the imaging system 2 is in the middle of recording the moving image (step S1004: Yes), the imaging system 2 proceeds to step S1005 described below. In contrast, in a case where the imaging controller 114 judges that the imaging system 2 is not in the middle of recording the moving image (step S1004: No), the imaging system 2 proceeds to step S1006 described below.

In step S1005, the imaging controller 114 generates, on the recording medium 110, a moving image file for recording image data in the time series. After step S1005, the imaging system 2 proceeds to step S1006 described below.

In step S1002, in a case where the moving image button on the operating unit 108 is not pressed (step S1002: No), the imaging system 2 proceeds to step S1006.

Subsequently, the imaging controller 114 judges whether the imaging system 2 is in the middle of recording a moving image (step S1006). In a case where the imaging controller 114 judges that the imaging system 2 is in the middle of recording the moving image (step S1006: Yes), the imaging system 2 proceeds to step S1017 described below. In contrast, in a case where the imaging controller 114 judges that the imaging system 2 is not in the middle of recording the moving image (step S1006: No), the imaging system 2 proceeds to step S1007 described below.

In a case where, in step S1007, a playback button on the operating unit 108 is pressed (step S1007: Yes), the imaging system 2 plays back and displays an image that corresponds to the image data recorded in the recording medium 110, on the display unit 119 (step S1008). After step S1008, the imaging system 2 proceeds to step S1009 described below.

In step S1007, in a case where the playback button on the operating unit 108 is not pressed (step S1007: No), the imaging system 2 proceeds to step S1009.

Subsequently, in a case where a menu button on the operating unit 108 is pressed (step S1009: Yes), the imaging system 2 executes setting processing of performing various settings (step S1010). Details of the setting processing will be described below. After step S1010, the imaging system 2 proceeds to step S1011 described below.

In step S1009, in a case where the menu button on the operating unit 108 is not pressed (step S1009: No), the imaging system 2 proceeds to step S1011.

In step S1011, in a case where the release button on the operating unit 108 is transitioned from the off-state to a 1st state (step S1011: Yes), the imaging controller 114 causes the AE processing unit 116 to execute AE processing of adjusting exposure and causes the AF processing unit 117 to execute AF processing of adjusting focus (step S1012). Thereafter, the imaging system 2 proceeds to step S1024 described below.

In a case where, in step S1011, the release button on the operating unit 108 has not transitioned from the off-state to the 1st state (step S1011: No), the imaging system 2 proceeds to step S1013.

Subsequently, in a case where the release button of the operating unit 108 has transitioned to the 2nd state (step S1013: Yes), the imaging controller 114 executes shooting using a mechanical shutter (step S1014). Specifically, the imaging controller 114 causes the image sensor 105 to execute shooting by controlling the shutter 103.

Subsequently, the imaging system 2 executes image processing, that is, first performs RTS noise correction onto the image data generated by the image sensor 105, and thereafter, performs predetermined processing (step S1015). Details of the image processing will be described below.

Thereafter, the imaging controller 114 records the image data that has undergone image processing by the image processing unit 303, on the recording medium 110 (step S1016). After step S1016, the imaging system 2 proceeds to step S1024 described below.

In step S1013, in a case where the release button of the operating unit 108 has not transitioned to the 2nd state (step S1013: No), the imaging system 2 proceeds to step S1017.

Subsequently, the imaging controller 114 causes the AE processing unit 116 to execute AE processing of adjusting exposure (step S1017), and causes the AF processing unit 117 to execute AF processing of adjusting the focus (step S1018).

Thereafter, the imaging controller 114 causes the image sensor 105 to electronically control the exposure time, that is, to execute shooting using an electronic shutter, via the driver 120 (step S1019). The image data generated with the electronic shutter by the image sensor 105 are output to the volatile memory 111 via the analog processing unit 106, the A/D converter 107, and the bus 113.

Subsequently, the imaging system 2 executes image processing similar to the processing in step S1015 (step S1020). Details of the image processing will be described below.

Thereafter, the imaging system 2 displays a live-view image that corresponds to the image data generated with shooting with the electronic shutter by the image sensor 105, on the display unit 119 (step S1021).

Subsequently, in a case where the imaging system 2 is in the middle of recording a moving image (step S1022: Yes), the imaging controller 114 causes an image compressing/ developing section (not illustrated) to compress the image data into a recording format set by setting processing in step S1010, and records the compressed image data as a moving image in a moving image file created on the recording medium 110 (step S1023). After step S1023, the imaging system 2 proceeds to step S1024.

In step S1022, in a case where the imaging system 2 is not in the middle of recording the moving image (step S1022: No), the imaging system 2 proceeds to step S1024.

Subsequently, in a case where a power button on the operating unit 108 is pressed and the power of the imaging system 2 turns into the off-state (step S1024: Yes), the imaging system 2 finishes the current processing. In contrast, in a case where the power of the imaging system 2 is not in an off-state (step S1024: No), the imaging system 2 returns to step S1002.

Figure 24:
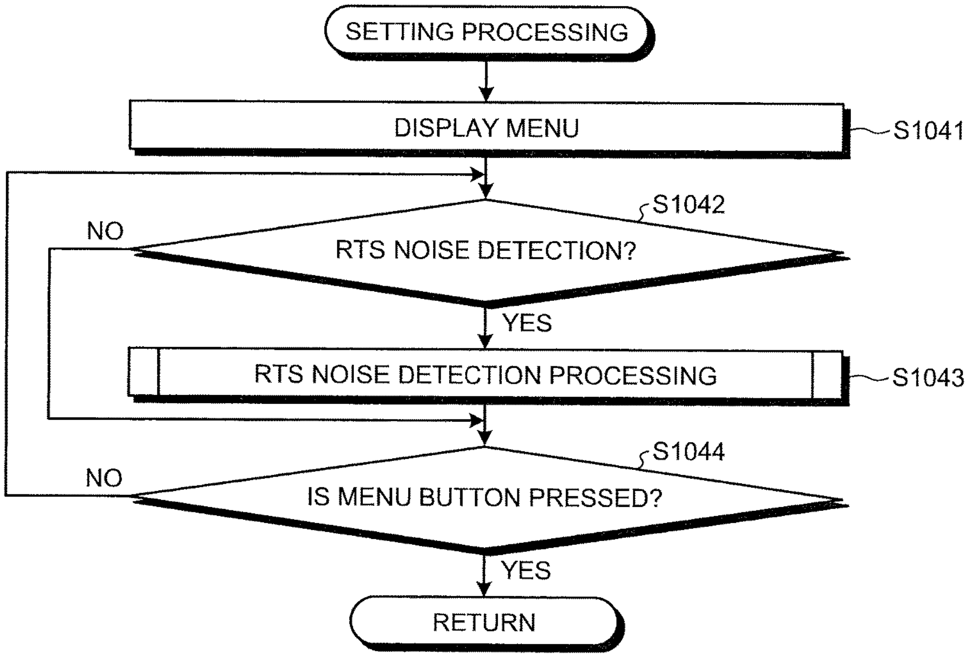
FIG. 24 is a flowchart illustrating an outline of setting processing in FIG. 23.

Next, setting processing described in step S1010 in FIG. 23 will be described. FIG. 24 is a flowchart illustrating an outline of the setting processing.

As illustrated in FIG. 24, the imaging system 2 displays a menu on the display unit 119 (step S1041).

Subsequently, in a case where detection of RTS noise is selected in response to the operation on the operating unit 108 (step S1042: Yes), the RTS noise detection unit 202 executes RTS noise detection processing (step S1043). Herein, since the RTS noise detection processing corresponds to the processing executed by the first image processing apparatus 20 according to the above-described first embodiment, description thereof will be omitted. After step S1043, the imaging system 2 proceeds to step S1044.

In a case where, in step S1042, detection of RTS noise in response to the operation on the operating unit 108 is not selected (step S1042: No), the imaging system 2 proceeds to step S1044.

Subsequently, in a case where the menu button on the operating unit 108 is pressed (step S1044: Yes), the imaging system 2 returns to the main routine in FIG. 23. In contrast, in a case where the menu button on the operating unit 108 is not pressed (step S1044: No), the imaging system 2 returns to above-described step S1042.

Figure 25:
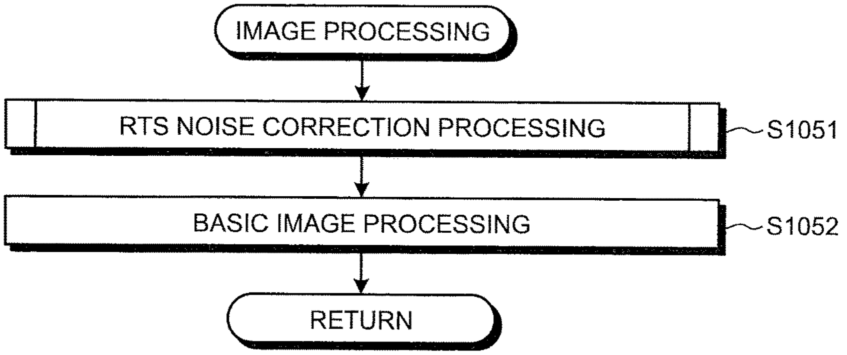
FIG. 25 is a flowchart illustrating an outline of image processing in FIG. 23.

Next, image processing described in steps S1015 and S1020 in FIG. 23 will be described. FIG. 25 is a flowchart illustrating an outline of image processing.

As illustrated in FIG. 25, the RTS noise correction unit 302 executes RTS noise correction processing of correcting RTS noise on the image data generated by the image sensor 105 (step S1051). The RTS noise correction processing corresponds to the processing executed by the second image processing apparatus 30 according to the above-described first embodiment, description thereof will be omitted.

Subsequently, the image processing unit 303 executes basic image processing onto the image data on which the RTS noise correction unit 302 has corrected the RTS noise (step S1052). After step S1052, the imaging system 2 returns to the main routine in FIG. 23.

With the above-described third embodiment of the present invention, effects similar to the effects of the above-described first embodiment can be achieved.

First Modification of First to Third Embodiments

In the above-described first to third embodiments the present invention, the RTS noise is corrected by calculating a plurality of candidate values. While the number of the plurality of candidate values is not particularly limited in the above description, it implies there is a plurality of candidate values substantially different from each other. For example, in a case where the RTS noise correction unit 302 is implemented by hardware in the first to third embodiments the present invention, circuit design would be simpler by using a fixed number for the plurality of candidate values. Specifically, it would be sufficient to prepare a memory for storing a plurality of candidate values for the above-described maximum number Max, and set a same value to the plurality of memories if the number of the plurality of candidate values is below Max. In this case, the number of candidate values stored in the memory is Max, while the number of substantially different candidate values is below Max. For example, in the above-described second embodiment of the present invention, in a case where the count value of the sharing blocks including the pixel of interest is two (when zero is not counted) and Max is seven, the circuit may be configured such that the following values are set in the memory:

C0=0
C1
C2
C2
C2
C2
C2

In another case where the count value of the sharing blocks including the pixel of interest is six (when zero is not counted), the circuit may be configured such that the following values are set in the memory:

C0=0
C1
C2
C3
C4
C5
C6

According to above-described First Modification of the first to third embodiments of the present invention, implementation of the circuit is possible such that an appropriate correction amount is always selected from a fixed number of (seven in the example above) candidate values without changing the target for selection depending on each of the count values.

Moreover, according to First Modification of the first to third embodiments of the present invention, even in a case where a maximum value of the candidate value is used instead of the RTS_Value of the pixel of interest, it would be sufficient to always refer to the candidate value on a same position in the above-described example (seventh position in the above-described example).

Second Modification of First to Third Embodiments

In the above-described first to third embodiments of the present invention, the RTS noise determination unit 202*e* may determine order of priority for RTS noise information and record the RTS noise information in the RTS noise information recording unit 112*b*. For example, the RTS noise determination unit 202*e* determines order of priority for the RTS noise information using one of (A) to (F) described below, and records the RTS noise information in the RTS noise information recording unit 112*b*.

raster order . . . (A)

in order of proximity to image center portion . . . (B)

RTS_Value in descending order . . . (C)

the number of candidates of correction amount in descending order . . . (D)

frequency of occurrence of RTS noise in descending order . . . (E)

occurrence density (denseness) of RTS noise in descending order . . . (F)

The method for determining the order of priority is not limited to, but the above-described (A) to (F) may be appropriately combined. For example, the RTS noise determination unit 202*e* may determine the order of priority: the order of proximity to image center portion (above-described (B)) as first priority; and RTS_Value in descending order (above-described (C)) or the number of candidates of correction amount in descending order (above-described (D)) as second priority. If the distance from the image center portion is the same, the RTS noise determination unit 202*e* may prioritize RTS_Value in descending order or the number of candidates of correction amount in descending order to record the RTS noise information in the RTS noise information recording unit 112*b*.

According to the above-described Second Modification of the first to third embodiments of the present invention, the RTS noise determination unit 202*e* prioritizes the RTS noise easily noticeable depending on usage situation, and records the RTS noise information in the RTS noise information recording unit 112*b* even in a case where there is an upper limit in the number of RTS noise information items recordable on the RTS noise information recording unit 112*b*. This configuration enables prioritized correction of the RTS noise easily noticeable depending on usage situation.

Moreover, in a case where there is limitation beforehand on the change of the image expansion rate and change of the display position in the above-described Second Modification of the first to third embodiments of the present invention, the RTS noise determination unit 202*e* may change the priority in accordance with the expansion rate or the display position, and may record the RTS noise information associated with the expansion rate or the display position, in the RTS noise information recording unit 112*b*. In this case, the RTS noise correction unit 302 may read the RTS noise information associated with the set expansion rate or the set display position and may perform correction processing.

According to some embodiments, it is possible to obtain a high quality image even if there is blinking defect noise that varies within a fixed range, such as the RTS noise.

Other Embodiments

The present invention is not limited to the above-described embodiments, but various modifications and further applications are of course available within the scope of the present invention. For example, besides the imaging apparatus used in the description of the present invention, the present invention can be applied to any apparatus capable of shooting a subject such as a mobile apparatus having an image sensor of a mobile phone or a smartphone or an imaging apparatus that images the subject by using an optical device such as a video camera, an endoscope, a surveillance camera, or a microscope.

Moreover, the present invention is applicable to image data other than the image data used for display and recording, for example, applicable to the image data in an OB area, and image data in an area outside the image circle, with no optical design assurance.

Moreover, in the description of the flowcharts for the operations described above in the present specification, terms such as “first”, “next”, “subsequently”, “thereafter” are used to describe operation for convenience. These do not denote, however, that the operations need to be performed in this order.

Moreover, the methods of the processing performed by the image processing apparatus in the above-described embodiments, that is, any of the processing illustrated in the flowcharts may be stored as a program that can be executed by a control unit such as a CPU. In addition, it is possible to distribute by storing in a storage medium of the external storage device, such as memory cards (ROM card, RAM card, etc.), a magnetic disk (floppy disk, hard disk, etc.), an optical disc (CD-ROM, DVD, etc.), a semiconductor memory. The control unit such as a CPU reads the program stored in the storage medium of the external storage device and controls the operation by the read program to execute the above-described processing.

Moreover, the present invention is not limited to the above-described embodiments and modification examples just as they are but can be embodied by modifying the components without departing from the scope of the invention at a stage of implementation of the invention. Furthermore, a plurality of components disclosed in the above-described embodiments may be appropriately combined to form various inventions. For example, some components may be omitted from the all the components described in the embodiments and the modification example. Furthermore, the components described in each of exemplary embodiments and modification examples may be appropriately combined with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for correcting blinking defect noise included in a plurality of pieces of image data generated by an image sensor, the image sensor including a plurality of pixels arranged two-dimensionally to receive light from outside and generate a signal corresponding to an amount of the received light, and including a plurality of read-out circuits configured to read out the signal as a pixel value, the image processing apparatus comprising:

a noise information acquiring unit configured to acquire noise information that associates the pixel value with positional information of the plurality of read-out circuits or positional information of each of the plurality of pixels, and with feature data related to blinking defect noise attributed to the plurality of read-out circuits;

a noise pixel determination unit configured to determine whether the blinking defect noise occurs on a pixel of interest based on the noise information acquired by the noise information acquiring unit;

a candidate value calculation unit configured to calculate a plurality of candidate values indicating a correction amount for correcting the blinking defect noise based on the noise information acquired by the noise information acquiring unit and based on a pixel value of the pixel of interest if the noise pixel determination unit determines that the blinking defect noise occurs; and a correction unit configured to correct the pixel value of the pixel of interest based on the plurality of candidate values calculated by the candidate value calculation unit.

2. The image processing apparatus according to claim 1, further comprising a representative value calculation unit configured to calculate a representative value from a pixel value of a surrounding pixel of the pixel of interest, wherein the correction unit is configured to correct the pixel value of the pixel of interest based on the pixel value of the pixel of interest, the plurality of candidate values, and the representative value.

3. The image processing apparatus according to claim 2, wherein the correction unit is configured to correct the pixel value of the pixel of interest based on a candidate value that allows the corrected pixel value of the pixel of interest to be closest to the representative value, among the plurality of candidate values.

4. The image processing apparatus according to claim 3, wherein the correction unit is configured to:

select, from among the plurality of candidate values, the candidate value that is the closest to an absolute value of a difference between the pixel value of the pixel of interest and the representative value; and change the pixel value of the pixel of interest by bringing the pixel value close to the representative value by the candidate value to correct the pixel value of the pixel of interest.

5. The image processing apparatus according to claim 3, wherein the correction unit is configured to correct, as the pixel value of the pixel of interest, a value closest to the representative value among a plurality of values obtained by adding each of the plurality of candidate values to the pixel value of the pixel of interest or by subtraction between the pixel value of the pixel of interest and each of the plurality of candidate values.

6. The image processing apparatus according to claim 1, wherein the feature data is amplitude of the blinking defect noise, and the candidate value calculation unit is configured to calculate the plurality of candidate values including the amplitude of the blinking defect noise and a value smaller than the amplitude and greater than zero.

7. The image processing apparatus according to claim 6, wherein the feature data further includes the number of candidates for a correction value for correcting the blinking defect noise, and the candidate value calculation unit is configured to calculate the plurality of candidate values based on the number of candidates for the correction value.

8. The image processing apparatus according to claim 1, further comprising a random noise calculation unit configured to calculate a random noise amount that occurs on the pixel of interest and on a surrounding pixel of the pixel of interest, based on the pixel value of the pixel of interest, wherein the candidate value calculation unit is configured to calculate, as the plurality of candidate values, values not greater than amplitude of the blinking defect noise at an interval of the amplitude of the blinking defect noise defined in accordance with the random noise amount calculated by the random noise calculation unit.

9. The image processing apparatus according to claim 1, wherein the candidate value calculation unit is configured to calculate, as the plurality of candidate values, values not greater than amplitude of the blinking defect noise from among a plurality of values set beforehand.

10. The image processing apparatus according to claim 1, wherein the candidate value calculation unit is configured to calculate, as the plurality of candidate values, values of a plurality of values set beforehand, the number of the values of the plurality of values set beforehand being determined in accordance with amplitude of the blinking defect noise in ascending order of absolute values of the plurality of values set beforehand.

11. The image processing apparatus according to claim 3, wherein the representative value calculation unit is configured to:

calculate an effective range of a pixel value based on the pixel value of the pixel of interest and based on a reference value of a random noise amount that occurs on the pixel of interest and on surrounding pixels of the pixel of interest, set in accordance with the pixel value of the pixel of interest; and calculate the representative value using pixel values of the surrounding pixels having the pixel value within the effective range.

12. The image processing apparatus according to claim 11, wherein, if the number of the surrounding pixels having the pixel value within the effective range is not greater than a predetermined number, the representative value calculation unit is configured to expand a reference range of the surrounding pixels.

13. The image processing apparatus according to claim 11, wherein the representative value calculation unit is configured to calculate a median value of the pixel value within the effective range, as the representative value.

14. The image processing apparatus according to claim 1, wherein the blinking defect noise is a random telegraph signal noise.

15. The image processing apparatus according to claim 1, wherein the image sensor is configured such that each of the plurality of read-out circuits is configured to read out the signal as the pixel value for each of predetermined number of pixels.

16. The image processing apparatus according to claim 1, further comprising a noise detection unit configured to detect positional information of each of a plurality of pixel value groups created by classifying the pixel value for each of the plurality of read-out circuits, and detect the feature data related to the blinking defect noise attributed to the plurality of read-out circuits.

17. An image processing method for correcting blinking defect noise included in a plurality of pieces of image data generated by an image sensor, the image sensor including a plurality of pixels arranged two-dimensionally to receive light from outside and generate a signal corresponding to an amount of the received light, and including a plurality of read-out circuits configured to read out the signal as a pixel value, the method comprising:

acquiring noise information that associates the pixel value with positional information of the plurality of read-out circuits or positional information of each of the plurality of pixels, and with feature data related to blinking defect noise attributed to the plurality of read-out circuits;

determining whether the blinking defect noise occurs on a pixel of interest based on the noise information;

calculating a plurality of candidate values indicating a correction amount for correcting the blinking defect noise based on the noise information and a pixel value of the pixel of interest if the blinking defect noise occurs; and correcting the pixel value of the pixel of interest based on the plurality of candidate values.

18. A non-transitory computer-readable recording medium with an executable program stored thereon, the program causing an image processing apparatus configured to correct blinking defect noise included in a plurality of pieces of image data generated by an image sensor, the image sensor including a plurality of pixels arranged two-dimensionally to receive light from outside and generate a signal corresponding to an amount of the received light, and including a plurality of read-out circuits configured to read out the signal as a pixel value, to execute:

acquiring noise information that associates the pixel value with positional information of the plurality of read-out circuits or positional information of each of the plurality of pixels, and with feature data related to blinking defect noise attributed to the plurality of read-out circuits;

determining whether the blinking defect noise occurs on a pixel of interest based on the noise information;

calculating a plurality of candidate values indicating a correction amount for correcting the blinking defect noise based on the noise information and a pixel value of the pixel of interest if the blinking defect noise occurs; and correcting the pixel value of the pixel of interest based on the plurality of candidate values.

* * * * *